United States Patent
Hayes

(10) Patent No.: US 8,499,233 B2
(45) Date of Patent: Jul. 30, 2013

(54) SYSTEMS AND PROCESSES FOR TRANSFORMING AND DISPLAYING ACCOUNTING AND FINANCIAL INFORMATION

(75) Inventor: John B. Hayes, Atlanta, GA (US)

(73) Assignee: John B. Hayes, Atlanta, GA (US)

( * ) Notice: Subject to any disclaimer, the term of this patent is extended or adjusted under 35 U.S.C. 154(b) by 271 days.

(21) Appl. No.: 12/367,985

(22) Filed: Feb. 9, 2009

(65) Prior Publication Data

US 2009/0201294 A1 Aug. 13, 2009

Related U.S. Application Data

(60) Provisional application No. 61/027,049, filed on Feb. 8, 2008.

(51) Int. Cl.
*G06F 17/00* (2006.01)
(52) U.S. Cl.
USPC ............................................. 715/204
(58) Field of Classification Search
USPC ............................. 705/30; 715/204
See application file for complete search history.

(56) References Cited

U.S. PATENT DOCUMENTS

| | | | |
|---|---|---|---|
| 7,050,997 B1 * | 5/2006 | Wood, Jr. .................. | 705/36 R |
| 8,015,078 B1 * | 9/2011 | Scalora et al. ................ | 705/28 |
| 2001/0011242 A1 * | 8/2001 | Allex et al. .................. | 705/36 |
| 2001/0032155 A1 * | 10/2001 | Groat et al. .................. | 705/35 |
| 2004/0148239 A1 * | 7/2004 | Albee et al. .................. | 705/36 |
| 2005/0144096 A1 * | 6/2005 | Caramanna et al. ........... | 705/30 |
| 2006/0074788 A1 * | 4/2006 | Grizack et al. ................ | 705/35 |
| 2008/0015960 A1 * | 1/2008 | Bang et al. .................... | 705/30 |

OTHER PUBLICATIONS

International Search Report & Written Opinion for PCT/US2009/033544 dated Jun. 3, 2009.

\* cited by examiner

*Primary Examiner* — Laurie Ries
*Assistant Examiner* — Andrew McIntosh
(74) *Attorney, Agent, or Firm* — Sutherland Asbill & Brennan LLP

(57) ABSTRACT

Embodiments of the invention can provide systems and processes for transforming and displaying accounting and financial information. One embodiment relates to the selection, or creation, and use of graphical symbols to represent the flow of cash in an organization, with the size of the graphical symbols presented approximately to scale. Another embodiment relates to the use of alternative units for displaying accounting and financial information, while another embodiment uses sound to present accounting and financial information, and yet another embodiment uses tactile display to present accounting and financial information.

20 Claims, 19 Drawing Sheets

Profit & Loss
January – December 2007

|  | Jan – Mar 2007 | Apr – Jun 2007 | Jul – Sep 2007 | Oct – Dec 2007 | Total |
|---|---|---|---|---|---|
| Income |  |  |  |  |  |
| 4001 | $168,282.91 | $201,956.54 | $261,275.66 | $334,173.51 | $988,888.62 |
| 4015 | 6,400.00 | 4,500.00 | 13,250.00 | 10,200.00 | 34,350.00 |
| 4016 | 0.90 | 4,072.84 | 17,621.01 | 48,196.62 | 89,691.37 |
| 4020 | 10,151.45 | 24,407.61 | 12,102.55 | 5,127.18 | 81,788.79 |
| Your Income | $184,835.26 | $234,936.99 | $304,249.22 | $397,697.31 | $1,121,718.78 |
| Cost of Goods Sold |  |  |  |  |  |
| 5010 CDS | $79,884.68 | $95,320.99 | $136,887.95 | $163,114.54 | $475,208.16 |
| 5015 | 3,200.00 | 2,667.28 | 11,909.74 | 9,368.86 | 27,156.88 |
| 5016 | 87.08 | 2,447.84 | 11,177.48 | 35,764.41 | 49,476.81 |
| Total Cost of Goods Sold | $83,171.76 | $100,436.11 | $159,975.17 | $208,247.81 | 551,830.85 |
| Gross Profit | $101,663.50 | $134,500.88 | $144,274.05 | $189,449.50 | $569,887.93 |
| Expenses |  |  |  |  |  |
| 6040 Bank Charges | 888.23 | 1,309.43 | 613.27 | 757.64 | 3,548.57 |
| 6045 Commissions & Fees | 3,769.38 | 8,192.48 | 11,288.22 | 34,947.62 | 58,175.70 |
| 6047 Contract Labor | 6,493.25 | 17,857.50 | 14,882.49 | 18,291.25 | 57,524.49 |
| 6048 Contract Labor – Tech |  |  |  | 1,495.00 | 1,495.00 |
| 6070 Dues & Subscriptions | 1,660.92 |  | 2,543.17 | 603.52 | 5,007.61 |
| 6085 Employee Benefit Programs | 23,882.13 | 27,483.67 | 38,911.18 | 40,962.44 | 131,239.32 |
| 6100 Insurance | 3,847.25 | 3,119.25 | 3,119.25 | 2,652.00 | 12,837.75 |
| 6115 Marketing | 22,619.29 | 37,840.75 | 40,903.69 | 34,179.95 | 136,543.88 |
| 6120 Meals and Entertainment | 2,511.31 | 6,296.52 | 7,575.35 | 8,924.58 | 25,307.76 |
| 6150 Office Expenses | 5,879.70 | 5,107.34 | 5,027.23 | 5,782.67 | 21,796.94 |
| 6155 Other General and Admin Expenses | 1,000.00 | 880.32 |  |  | 1,880.32 |
| 6160 Recruiting | 5,000.00 | 9,573.80 | 23,333.00 | 47,636.00 | 85,542.80 |
| 6170 Postage and Delivery | 1,076.43 | 1,321.74 | 1,422.01 | 1,204.44 | 5,042.62 |
| 6176 Printing | 1,407.02 | 1,660.31 | 589.96 | 1,072.22 | 4,819.51 |
| 6180 Legal & Professional Fees | 7,967.87 | 8,976.51 | 21,064.56 | 23,157.44 | 61,166.38 |
| 6200 Rent or Lease | 19,443.36 | 23,682.25 | 42,063.92 | 50,152.37 | 135,341.90 |
| 6220 Repair & Maintenance | 707.27 | 784.94 | 6,047.75 | 539.38 | 8,079.35 |
| 6225 Research Expense | 3,837.00 | 9,304.85 | 4,854.02 | 3,028.10 | 15,023.97 |
| 6230 Supplies | 4,227.78 | 6,509.82 | 5,346.75 | 2,789.55 | 18,873.90 |
| 6240 Taxes & Licenses | 1,249.85 | 3,127.02 | 501.35 | 646.88 | 5,815.10 |
| 6280 Travel | 15,069.13 | 21,097.23 | 14,040.00 | 16,749.59 | 67,556.85 |
| 6285 Travel Meals | 119.07 | 899.90 | 1,609.06 | 1,257.16 | 3,966.19 |
| 6280 Travel – Sales Regs | 18,432.27 | 34,355.45 | 47,880.70 | 39,108.10 | 140,778.52 |

FIG. 1A
(PRIOR ART)

Balance Sheet
As of December 31, 2007

|  | Total |
|---|---:|
| ASSETS | |
| Current Assets | |
| Bank Accounts | |
| 1000 Demand Deposit Accounts | |
|   1002 Bank of | 1,348.12 |
|   1004 – Operating | 95,214.28 |
| Total 1000 Demand Deposit Accounts | $96,560.40 |
| 1050 Certificates of Deposit | |
|   1052 - Bank & Trust – CD | 103,840.07 |
| Total 1050 Certificates of Deposit | 103,840.07 |
| 1070 - Reserve | 11,755.64 |
| Total Bank Accounts | $212,156.11 |
| Accounts Receivable | |
|   1100 Accounts Receivable | 257,146.74 |
| Total Accounts Receivable | $257,146.74 |
| Other Current Assets | |
|   1300 Prepaid Expenses | 237,311.64 |
|   1361 Notes Receivable | 2,091,626.57 |
| Total Other Current Assets | $2,328,838.41 |
| Total Current Assets | 2,798,141.26 |
| Fixed Assets | |
|   1500 System Assets | 1,250,000.00 |
|   1505 Depreciation | -354,168.44 |
| Total 1500 System Assets | 895,835.55 |
|   1510 Computers & Equipment | 118,263.56 |
|   1515 Depreciation | -54,082.42 |
| Total 1510 Computers & Equipment | 64,201.13 |
| Total Fixed Assets | 960,039.69 |
| TOTAL ASSETS | $3,758,175.95 |
| LIABILITIES AND EQUITY | |
| Liabilities | |
| Current Liabilities | |
| Accounts Payable | |
|   2000 Accounts Payable | 129,309.21 |
| Total Accounts Payable | 129,309.21 |
| Other Current Liabilities | |
|   2035 Payroll Related Payable | 22,295.29 |
|   2060 Line of Credit Payable | |
|     2061 – Line of Credit | 2,091,526.57 |
| Total 2060 Line of Credit Payable | 2,091,526.57 |
| Total Other Current Liabilities | 2,124,921.86 |
| Liabilities | 2,254,231.07 |
| | 2,254,231.07 |
| Equity | |

FIG. 1B
(PRIOR ART)

Statement of Cash Flows
January – December 2007

| | Jan – Mar 2007 | Apr – Jun 2007 | Jul – Sep 2007 | Oct – Dec 2007 | Total |
|---|---|---|---|---|---|
| OPERATING ACTIVITIES | | | | | |
| Net Income | $-193,938.10 | $-590,049.48 | $-709,704.02 | $-723,717.02 | $-2,417,489.22 |
| Adjustments to reconcile Net Income to Net Cash provided by operations: | | | | | $0.0 |
| 1100 Accounts Receivable | -60,360.70 | -40,765.58 | -32,768.52 | -52,092.03 | -185,983.83 |
| 1101 Cue from Employees | -381.61 | | | | -331.51 |
| 1381 Notes Receivable | -10,000.00 | -215,893.12 | -134,531.29 | -1,211,102.18 | -2,091,526.37 |
| 1300 Prepaid Expenses | -52,764.35 | 1,554.74 | -8,847.45 | -139,728.07 | -192,765.13 |
| 1515 Computers & Equipment Depreciation | 4,557.52 | 1,275.03 | 8,633.88 | 8,967.04 | 27,488.15 |
| 1505 System Assets Depreciation | 20,833.32 | 20,833.32 | 20,831.32 | 20,833.32 | 83,333.28 |
| 2000 Accounts Payable | 18,829.91 | 13,157.99 | 54,982.64 | 13,493.09 | 110,463.33 |
| 2051 Line of Credit Payable | 10,000.00 | 188,152.03 | 634,271.95 | 1,211,102.16 | 2,091,526.57 |
| 2035 Payroll Related Payable | 0.00 | | 11,021.30 | 22,371.99 | 33,395.29 |
| Net cash provided by operating activities | $-463,274.01 | $-614,735.04 | $-614,071.21 | $-849,872.88 | $-251,959.14 |
| INVESTING ACTIVITIES | | | | | |
| 1510 Computers & Equipment | -17,922.34 | -21,928.64 | -8,161.21 | -17,191.48 | -65,205.07 |
| Net cash provided by investing activities | $-17,922.34 | $-21,928.64 | $-8,161.21 | $-17,191.48 | $-65,205.07 |
| FINANCING ACTIVITIES | | | | | |
| 3028 Additional Pak-in Capital for Preferred | 16,620.33 | | 1,294,358.15 | | 1,810,976.18 |
| 3029 Equity Charting Account | -5,685.95 | | -38,993.07 | | -44,879.02 |
| 3030 Preferred Convertible Debenture | -90,425.38 | 344,618.33 | -447,169.57 | 772,847.06 | 179,870.50 |
| 3031 Preferred Shares | 55.03 | | 131.88 | | 192.09 |
| Net cash provided by financing activities | $20,564.05 | $344,618.33 | $828,331.37 | $772,847.05 | $1,944,362.15 |
| Net cash increase for period | $-460,682.30 | $-292,045.33 | $118,092.95 | $-94,217.31 | $-650,801.36 |
| Cash at beginning of period | | | | | 0.00 |
| Cash at end of period | $-480,832.30 | $-292,045.33 | $118,092.95 | $-94,217.31 | $-680,801.96 |

FIG. 1C
(PRIOR ART)

FTRANS
CAPITAL FLOW MODEL™

VIEW THE TRADE CREDIT EXPRESS™ DEMO | SEND TO A FRIEND | CONTACT US

GET STARTED

The model provides a view into the flow of funds through a business. Assets are the primary components of what consumes cash. Liabilities, Equity, and Cash Flow (earnings before depreciation and amortization) are the primary contributors of Cash.

To increase cash in your business you must either increase profits, increase liabilities or equity, or reduce assets. FTRANS™ provides small and mid-size business owners with a solution to increase their cash flow in the most economical manner.

Enter your business information to see how it works.

The information you enter is not stored in a database or transmitted over the internet. You will have the option to print a copy of your Capital Flow Model.

YOUR BALANCE SHEET

741

○ Input %   ⦿ Input as $   ❮❮ GO BACK

Annual Sales (?) [ ]
Cost of Sales (?) [ ]
Operating Cost (?) [ ]
Interest & Taxes (?) [ ]
Assets (?)
Cash (?) [ ]
Accounts Receivable (?) [ ]
Inventory (?) [ ]
Plant & Equipment (?) [ ]
Other Assets (?) [ ]

Accounts Payable (?) [ ]
Bank Loans & Loans From Outsiders (?) [ ]
Other Liabilities (?) [ ]
Owner's Equity & Insider Loans (?) [ ]
Dividends Paid to Owners (if any) (?) [ ]

\>> VIEW YOUR MODEL

* Round to the nearest dollar.

The Capital Flow Model is used by FTRANS™ under license. Patent Pending Copyright © 2008 FTRANS Corp. All rights reserved. | Suggestions & Comments | FAQ

FTRANS

SYSTEMS AND PROCESSES FOR TRANSFORMING AND DISPLAYING ACCOUNTING AND FINANCIAL INFORMATION

CROSS-REFERENCE TO RELATED APPLICATION

This application claims the benefit of U.S. provisional Ser. No. 61/027,049, entitled "Symbolic Accounting: A Method for Improved Comprehension of Financial Information," filed 8 Feb. 2008, the contents of which are incorporated herein by reference.

FIELD OF THE INVENTION

The invention generally relates to accounting and finance, and more particularly, relates to systems and processes for transforming and displaying accounting and financial information.

BACKGROUND OF THE INVENTION

Early History of Accounting

Accounting and financial information is critical to the operation of enterprises worldwide, from large to small, for profit and not for profit, private and public. Yet, despite its importance in commerce and the economy, a comprehensive understanding of the meaning of accounting and financial information is beyond the reach of most people and is comprehendible only to persons with in-depth training in accounting or finance.

Commerce and trade have been a part human existence for tens of thousands of years. At some point, at least 5,000 years ago, man began recording trade transactions, presumably to keep track of what was owed to the seller by the buyer. Tablets from Babylonian, Egyptian, Greek, and other early cultures provide evidence that inventories and trade account transactions were inscribed in clay tablets, scrolls, and memorialized in other forms. At first, these tractions were merely lists or memorandum relating to the transaction. The Code of Hammurabi written in about 2250 B.C. sets forth detailed rules for credit transactions between merchants and agents and required written evidence (probably clay tablets initially followed by writings on skin then paper scrolls as technology evolved) of transactions and the listing of transactions in accounts in order for the payment of the debt to be enforced.

About six hundred years ago, trade between city-states in what is now Italy and the rest of the world, including northern Europe and far-east Asia, had advanced to a well-developed state. The Medici family and their affiliates opened banks in a number of Italian cities as well as several locations in northern Europe to facilitate trade. At some point prior to or during this period Italian merchants began recording their transactions in ledgers with two columns, one for "debitore," or the party to owed an amount, and the other column for "creditors," the party to whom the amount was owed. The advantage of this double-entry system is that is allows a quick check that accounts are in balance by comparing the sum of each column. Over time, the merchants added internal as well as external transactions to the lists and preserved the concept that each "debit" was matched with a "credit," even if there were not external debtors or creditors.

Knowledge about methods for keeping track of accounts was apparently passed from person to person. Although many early texts make reference to "accounts" and "ledgers," there does not seem to be any published work defining how accounting works until 1494. In that year, Luca Pacioli, a Franciscan monk, published a book summarizing "all that was known" at the time on mathematics and geometry; he included a chapter on double-entry accounting. A number of other published works followed, and many expanded on explaining how double entry accounting works, and suggesting that a variety of separate ledger books should be kept.

Despite its strengths as a method for keeping accounts in balance, double entry accounting did not provide much assistance in the presentation of the overall financial picture of the enterprise for several hundred years. During that time, books of accounts were kept for private and other essentially local enterprises, whether they were local merchants, banks that might have offices in several cities, or religious institutions. The method of keeping the books and the presentation of the financial information was entirely in the purview of the proprietor since it was not published for public use.

In the 1800s, in both the United States and in Europe, especially in England, the rise of the corporate form of business enterprise created the demand for a uniform presentation of financial information to be able to evaluate the condition of these new "public" entities. In the United States, the primary pressure was from investors in railroads, steel manufacturing, and other emerging industrial companies that were selling stock to the public to raise capital. The investors wanted a consistent method of presentation of the financial condition of each entity by which to compare operating results and financial condition with other entities.

During the late 1800s, several developments occurred that provide the foundation for modern practices of accounting and finance, including:

An emphasis on the use of an income statement to show operating results over time.

The use of a balance sheet to summarize the financial position of an enterprise at a point in time, including the incorporation of profit from the income statement.

Charles Sprague published (about 1880) the Equation of Accounting (Assets=Liabilities+Equity) that is the basis of the presentation of balance sheets today.

Professional training of accountants.

Creation of professional associations of accountants, such as the predecessor organization to the American Institute of Certified Public Accountants.

Despite these advances, by 1900 the field of accounting was fairly primitive compared to the state of the accounting profession today. In the first half of the twentieth century, a number of additional developments occurred, including:

The requirement by states for the certification of public accountants.

Adoption by associations of professional accountants of standards for presentation of financial information.

Following the creation of the Wharton School at the University of Pennsylvania in 1881, many universities created undergraduate and graduate level programs for professional business training. These business schools established finance and occasionally accounting as specific fields of study. The Securities and Exchange Commission was created in 1933 to regulate the sale of stock to the public. The SEC adopted and has largely maintained the position that the accounting profession should take a leading role in developing the definitions for what constitutes generally accepted accounting principles, occasionally weighing in to promote disclosure and accounting principles that the SEC deems important for the protection of the investing public. As a result of growth of larger and more national companies during the twentieth century, and the requirements of the SEC for audits and adherence to standards, the field of accounting developed into a large and respected profession.

Technology of Accounting

As discussed in the prior section, early records of accounting transactions were kept on clay tables and paper and leather scrolls. As book making became more advanced, accounting records were kept in ledger books, frequently a separate book for each type of transaction.

Until the perfection of the mechanical adding machine in the late 1800s, the abacus was the primary calculation tool available. In the early 1900s, a variety of tabulating machines were developed that facilitated the keeping of accounting data in a machine readable form for larger organizations, including the Computing Tabulating Recording Company, which became IBM. A number of companies, including IBM, Burroughs, National Cash Register (NCR), Freidan, and Monroe, made tabulating machines that used punched cards, punched tape, or magnetic tape or stripes to keep a record accounting transactions and be able to electromechanically add the sums.

Within a few years of the development of first digital computer at the Moore School at the University of Pennsylvania in the mid-1940s, a number of manufacturers were producing digital computer systems. These manufacturers included many of the accounting machine manufacturers, including IBM, NCR, and Burroughs. These mainframe computers were large and expensive and typically purchased only by very large companies, governments, or universities. A number of accounting applications were written for these mainframe computers, typically on a custom basis tailored for the specific enterprise.

In 1957, engineers from MIT founded Digital Equipment Company ("DEC") to build "mini-computers," which were very popular for scientific and engineering applications. There were a few accounting applications written for the mini-computers, but they were very limited in distribution to perhaps a few thousand installations. Most accounting applications at the time were either custom designed for the organization or custom modifications of a standard core application. In the mid-1960s, IBM released its own mini-computer, but restricted its distribution to limited engineering applications for fear of cannibalizing its mainframe sales.

The inventor began his computer programming experience with the early IBM mini-computer, the IBM 1140, and two mainframe computers, a CDC 6400 and a Boroughs 800, while an engineering student at Georgia Tech and as a co-op student in a systems engineering group at an aerospace contractor, Martin Marietta Corporation (now Lockheed Martin) in the period 1967 to 1970. In 1972, as a staff employee of the U.S. Senate, the inventor designed a word processing application for mini-computers that was implemented by Wang Laboratories.

In 1974, the inventor organized a team to develop accounting software for DEC mini-computers.

The first commercially viable personal computer was the Altair, created by MITS, Inc. of Albuquerque, N. Mex. in 1974. The Altair was introduced in January 1975. During 1975, a number of software developers entered into development agreements with MITS. Paul Allen joined MITS as head of software development and Bill Gates entered into an agreement with MITS to develop a BASIC interpreter for the Altair.

The inventor entered into an agreement with MITS to develop his accounting software for the Altair, retaining the right to market it on other platforms following the lead of Gates with the BASIC interpreter. The inventor organized a company called TCS Corp. to develop and market the software. In June 1976, TCS Corp. demonstrated the accounting software running on an Altair computer to the American Bar Association annual meeting in Atlanta; the software was called the "Total Office Manager™." Under the agreement with MITS, TCS Corp. marketed the accounting software under the name "Altair Business System™."

Sales of accounting systems and Altair computers were slow and sporadic for the next five years. After MITS ceased doing business in 1977, TCS Corp. renamed the company "Peachtree Software" and the software "Peachtree Accounting" and the focused its development efforts on a wide variety of other Altair-like personal computers, almost all of which used Intel microprocessors.

In 1980, Peachtree Software entered into an agreement with IBM to co-label Peachtree Accounting with the new IBM-PC™ that was introduced in 1981. Also in 1981, Peachtree Accounting was sold to Management Science America ("MSA"), at the time the world's largest independent software manufacturer. MSA sold Peachtree Software to Intelligent Systems in 1985, who sold it to the private equity firm Welsh Carson Anderson & Stowe in 1988. Welsh Carson sold Peachtree Software to ADP Corporation in the early 1990s. ADP sold it to Sage Software in the late 1990s; Sage continues to market Peachtree Accounting today; it appears to be the second most widely distributed business accounting software application in the world, second only to QuickBooks™ by Intuit. QuickBooks™ was created by Intuit in the late 1980s as a business accounting application to complement its highly successful Quicken™ personal accounting software application. During this period a large number of other business accounting software applications entered the market. Several highly successful applications were acquired by either Microsoft or by Sage.

Limitations of Conventional Accounting Technology

Virtually all of the accounting software programs today use the double-entry method of accounting as the basis of keeping track of accounts and present financial statements in essentially the same way: as tabular lists of accounts and corresponding dollar values, organized by type of accounts into an income statement (also called a statement of profit and loss) and a balance sheet (also called a statement of financial position). Many other financial statements and reports are available from the accounting software applications. The all report information in a similar fashion: tabular or cross-tab lists of values, with the typical values of dollars, percentages of same reference number (such as sales), and in some cases a few operating ratios. Occasionally, a single set of values may be displayed in a graphical fashion, such as revenue over time, a pie-chart of categories of expenditures, or a bar chart comparing categories (such as sales) to other periods or to a budget. However, the use of graphical presentation in accounting software today is very limited.

All of the major business accounting software applications were converted to or redeveloped in operating systems employing graphical user interfaces, such as Microsoft Windows™ or the operating system for the Apple Computer™. These graphical user interfaces allowed for screens to be more appealing through the use of color of better formatting. But, the graphical interface has been merely an improved screed to display tabular data. A few key items may be available as line graphs, pie charts, or similar simple graphics. But, none of these systems have taken full advantage of the graphical and other multimedia technology of modern computers to organize the presentation of financial information.

Conventional Accounting Practice, Education, and Information Comprehension

During the past 50 years, there have been major advances in accounting, the accounting profession, and the technology to support accounting. From the point of view of the accounting profession, these advances have focused on improving what information is captured and reported in order to make the financial statements more accurately reflect the condition of the enterprise. From the non-professional point of view, these advances have focused both on simplifying the user interface and improving the accuracy of the information captured and reported. However, the advances in the professional accounting community or and the non-professional accounting user community have not focused to any significant degree on the issue of overall comprehension for the non-professional user of accounting information. A number of organizations publish material attempting teach persons not trained in accounting or finance how to read financial statements and how to understand double-entry accounting, but these efforts to train non-financial persons to be able to comprehend financial statements appear to have fallen far short.

Much of language of accounting is highly technical and has meanings that are specialized and not consistent with the ordinary usage of a term. For example, many people believe, and even some elementary accounting texts teach, that "debit" means "left column of a ledger book" and "credit" means "right column of a ledger book," an overly simplistic definition that hides the true meaning of the terms. In a similar fashion, the term "asset" has a positive meaning in the common vernacular and "liability" has a general negative connotation. Yet, in accounting, liabilities produce cash and assets consume cash, a fact contrary to the common usage of the terms.

Professionals trained in finance or accounting generally understand how to read conventional financial statements, but still may misinterpret or otherwise not readily perceive certain relevant data in such statements. The non-professional, who may have a greater need to interpret such information, generally lacks the requisite financial knowledge and/or skills to fully understand and appreciate such information when presented in conventional financial statements.

The business accounting software vendors that sell a majority of their products to non-professionals should be motivated to develop a more accessible, more comprehendible, and less intimidating method of presentation of financial information as well as a more accessible entry of data. But, the idea of presenting the static balances and dynamic flows as symbolic representations, has eluded accounting software manufacturers and developers. Likewise, the notion of presenting the same accounting data in alternative units, other than just percentages of defined measure, such as sales, has also been opaque to the industry.

FIGS. 1A, 1B, and 1C depict common conventional financial statements available in QuickBooks™, one of the most widely distributed business accounting software products in the world. Most business owners can pick off the Income Statement (FIG. 1A, also called a Statement of Profit & Loss) a few key metrics, such as revenue and net income and from the Balance Sheet (FIG. 1B, also called a Statement of Financial Position) cash. However, most business owners are probably at a loss to answer the simple but critical question "what are your two largest sources of cash and your two largest uses of cash?" It has been observed that most business owners cannot read what is perhaps the most import financial report, the Statement of Cash Flows (FIG. 1C).

Part of the difficulty in current practice is that to understand financial statements today a user has to understand at least some part of double entry accounting—that "assets=liabilities+equity" and the related concepts that for entry there must be a contra-entry. This means that for even a base level of literacy of financial information, there must be learned a vocabulary and a set of rules of construction—the "rules of grammar" for accounting. Without detailed formal instruction, it has been difficult for a individual to grasp these fundamental concepts.

Conventional Information Comprehension for Persons with Disabilities

The previous section describes the limitations of the current practice and education relating to accounting and financial reporting for the typical user. The problems faced by persons with disabilities are even more acute, especially persons with visual disabilities. Reading and comprehending all but the most basic financial statements is almost imposable for persons with visual disabilities. Most accounting information and financial reporting is in printed form with rows of text and columns of numbers, or the equivalent forms on a computer screen. Large-text printed forms and large-text computer displays may provide some assistance. Efforts have been made to display accounting information in the Braille alphabet and to have text-to-speech computer software "read" the numbers to the visually impaired, the results to date are limited, in part because both the Braille presentation and the text-to-speech is essentially linear, presenting information from left to right rather than being able to display an entire table or other large dataset at one time.

Accordingly, a need exists for systems and processes for transforming and displaying accounting and financial information.

SUMMARY OF THE INVENTION

Embodiments of the invention can address some or all of the above needs. Certain embodiments of the invention can provide systems and processes for transforming and displaying accounting and financial information. In accordance with one embodiment, accounting and financial information, traditionally presented in a row and column format, can be transformed and displayed in a manner that facilitates comprehension by the user by being presented as a set of graphical flow charts. Another embodiment can provide for transforming and displaying of a presentation with the use of alternative units of measure to present accounting and financial information. Yet another embodiment can provide for the transforming and displaying of accounting and financial information with the use of motion graphics to present accounting and financial information. A further embodiment can provide for the transforming and displaying of accounting and financial information with the use of sound to depict accounting and financial information. Yet another embodiment can provide for the transforming and display of accounting and financial information with the use of mechanical devices with tactile expression. Another embodiment provides for the transforming and display of accounting and financial information with the use of electrical and optical devices with tactile expression.

In one example embodiment, a process for transforming and displaying financial information associated with a report can be provided. The process can include examining, by a processor, a plurality of elements to determine a respective information state associated with each of the plurality of elements. The process can also include for each of the plurality of elements, selecting, by a processor, at least one form based at least in part on the respective state associated with the respective element. In addition, the process can include selecting, by a processor, one or more sub-elements associated with the respective elements. Furthermore, the process can include selecting at least one form for each sub-element. Moreover, the process can include outputting the selected forms for the elements and sub-elements in a presentation.

In another example embodiment, a process for transforming and displaying financial elements associated with a report can be provided. The process can include examining, by a processor, each of a plurality of elements to determine current units of measure associated with each of the plurality of elements. The process can also include determining, by a processor, a form and an alternative unit of measure for each of the plurality of elements. Furthermore, the process can include selecting, by a processor, one or more sub-elements for output with the respective alternative unit of measures. In addition, the process can include selecting at least one alternative unit of measure for each of the one or more sub-elements. Moreover, the process can include calculating a value of the one or more sub-elements. Furthermore, the process can include outputting the calculated value in the alternative unit of measure in a presentation.

In yet another example embodiment, a system for transforming and displaying accounting and financial information can be provided. The system can include a developer transformation module operable to determine one or more elements in a financial report. The developer transformation module can be further operable to transform each of the one or more elements into respective forms for output to a presentation. Furthermore, the developer transformation module can be operable to determine one or more sub-elements associated with the one or more elements. Moreover, the developer transformation module can be operable to transform each of the one or more sub-elements into respective forms for output to the presentation.

Other systems and processes according to various embodiments of the invention will become apparent with respect to the remainder of this document.

BRIEF DESCRIPTION OF THE DRAWINGS

Reference will now be made to the accompanying drawings, which may not necessarily be drawn to scale, wherein:

FIGS. 1A, 1B, and 1C show financial reports presented in a conventional form.

FIGS. 7A to 7H show example webpages associated with an example system and process for transforming and displaying accounting and financial information in accordance with an embodiment of the invention.

DETAILED DESCRIPTION OF EMBODIMENTS

Figure 2A:
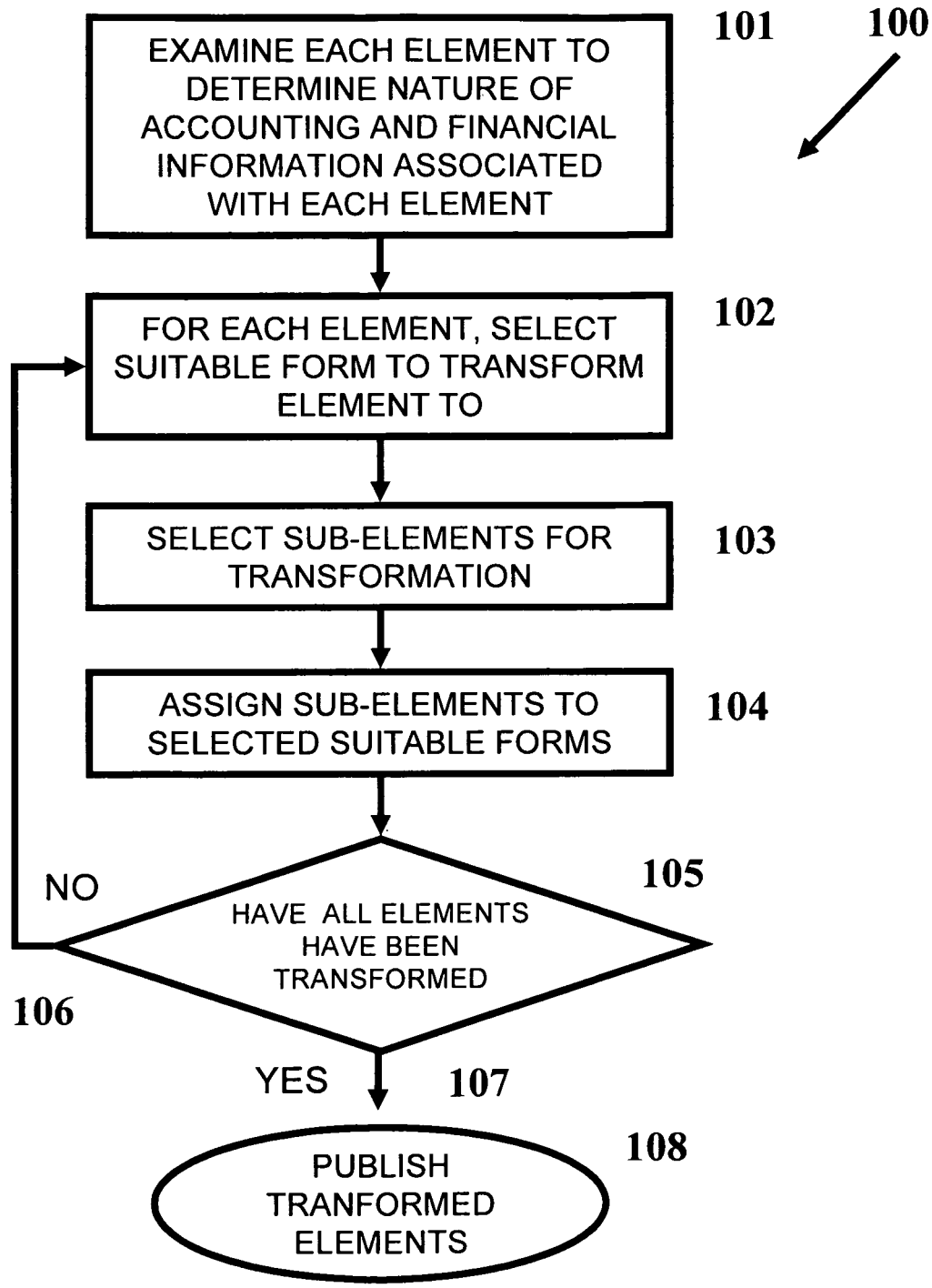
FIGS. 2A and 2B show example processes for transforming and displaying accounting and financial information in accordance with embodiments of the invention.

The invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will convey the scope of the invention. Like numbers refer to like elements throughout.

As defined and used within this specification, "accounting and financial information" refers to accounting and financial information utilized by individuals, corporations, partnerships, other business entities, governments, governmental agencies, not-for-profit organizations, and any other party or entity.

A "presentation" of accounting information, financial information, elements, or reports used in this specification refers to the expression of such information, element, or reports in a manner that can be perceived by a human.

The terms "transform," "transforming," "transformed," and "transformation" used in this specification refer to a process of changing certain raw data associated with accounting information, financial information, or reports into a graphical format or picture that can be displayed or otherwise output by a device as a physical representation of the data in a new form. Example new forms that such data can be transformed into can include, but are not limited to, static graphics, static graphical figures, moving graphics, moving graphical figures, tactile forms, sounds, and any combination thereof.

The terms "display," "displaying," "displayed," and "output" used in this specification refer to expressing a presentation of accounting information, financial information, or reports in a manner intended to be perceived by one or more humans, for example, by visual, audible, or tactile perception.

The term "tactile" used in this specification relates to the sense of touch or being able to be perceived by the sense of touch or otherwise sensed as a result of proximity to or contact with a human.

The terms "developer" and "developer transformation engine" used in this specification refer to a processor-based device, or a hardware and/or software component or module, which utilize one or more embodiments of the processes described herein. In certain embodiments, the term "developer" can also refer to a person who utilizes one or more embodiments of the systems or processes described herein.

The term "presenter" used in this specification refers to a processor-based device, or a hardware and/or software component or module, which presents, displays or otherwise outputs a presentation. In certain embodiments, the term "presenter" can also refer to a person who presents, displays, or otherwise outputs a presentation.

The term "element" refers to a part of a convention financial report. For example, a balance sheet may list the element "assets." The term "sub-elements" refers to subdivisions of an element that may not appear on the conventional financial report, but are constituents of the element and for which information exists in the underlying data. For example, the element "assets" on a financial report may not show any subdivisions, but the underlying data may contain one or more sub-elements associated with the financial report such as: cash; accounts receivable; inventory; property, plant & equipment, and other assets.

Certain embodiments of the invention can provide systems and processes for transforming and displaying accounting and financial information. Example embodiments of a process are illustrated in FIGS. 2A (construction) and 2B (display), and FIG. 3. The process 100 illustrated in FIG. 2A begins at block 101. In block 101, each element is examined to determine the nature of the accounting and/or financial information associated with each element.

In certain embodiments, the subject accounting and/or financial information may exist as raw accounting data in a computer database or assembled as accounting or financial reports, including formats recommended by specific bodies, such as governmental agencies or accounting organizations, or other formats. In other words, a report containing accounting and/or financial information can be in compliance with generally accepted accounting principles ("GAAP") as promulgated in the United States by the Financial Standards Accounting Board ("FASB"), the International Financial Reporting Standards ("IFRS") promulgated by the International Accounting Standards Board ("IASB"), or any other format. Embodiments of the invention can be compatible with any suitable presentation form of accounting and/or financial information.

In one embodiment, accounting and financial information can be extracted by a developer from one or more existing data sources or otherwise entered by the user. The information extracted from existing data sources can be information maintained in legacy systems in a wide variety of formats, including relational and hierarchal databases, common database formats such as SQL, proprietary databases or formats, such as used by Peachtree Accounting, QuickBooks, or Microsoft Dynamics, and other forms. In this example, legacy systems can be existing databases of information on companies, accounting systems, and other data stores.

In the embodiment shown in FIG. 2A, the examination of each element and report can be performed by at least one developer to determine the character of the information presented. For example, a developer can be a developer transformation engine, such as 801 in FIG. 9. That is, a determination can be made by a developer whether the accounting and financial information is essentially static, dynamic, measured at a point in time, measured over a period of time, or is in some other state, in order to determine how the information will be transformed by subsequent process elements.

Block 101 is followed by block 102, in which for each element, the developer can select at least one suitable form for each element based at least in part on the character of the information presented. In this embodiment, a developer such as a developer transformation engine 801 can select a suitable form for each element associated with a presentation, such as assets in a balance sheet. For example, one or more existing or predefined graphic forms can be selected by the developer, such as in block 201 in FIG. 3, or a developer can create a new form, such as a new static form in block 202 in FIG. 3. Example existing or predefined forms can include, but are not limited to, a static graphic, a moving graphic, a tactile form, a sound form, and any combination thereof. In any instance, at least one suitable expression form for each element is selected. In one example, a developer can select a relatively large rectangle to represent the capital structure of the organization, relatively smaller rectangles to represent certain operational steps in the organization that expend cash, and graphical open arrows to illustrate the flow of cash towards or away from the organization. The developer can also select arrows with broken borders to illustrate the flow of cash. Certain cash flows that flow into the organization can be organized adjacent to the upper and left sides of the large rectangle representing the organization with certain arrows pointing into the capital structure of the organization, and cash flows that flow out from the organization at the right side of the large rectangle representing the organization, wherein the arrows pointing away from the organization symbolize that cash is exiting or flowing away from the organization.

In one embodiment, a developer can select certain forms, such as graphical arrows, for particular elements and/or sub-elements related to an income statement, such as sub-elements, based on the observation that such elements and/or sub-elements measure information over a period of time, such as a month, quarter, or year. In addition, the developer can select certain forms, such as graphical arrows, for particular elements and/or sub-elements related to a balance sheet, such as sub-elements, based on the observation that such elements and/or sub-elements are measurements at a point in time, typically the last day of the period of the income statement.

In one embodiment, the selected or newly created forms may be either in two and/or three dimensions for static views and in two or more dimensions plus a dimension of time for dynamic views. Furthermore, the selected or newly created forms may be in any number of colors, such as black and white, grey scale, or multiple colors.

Figure 3:
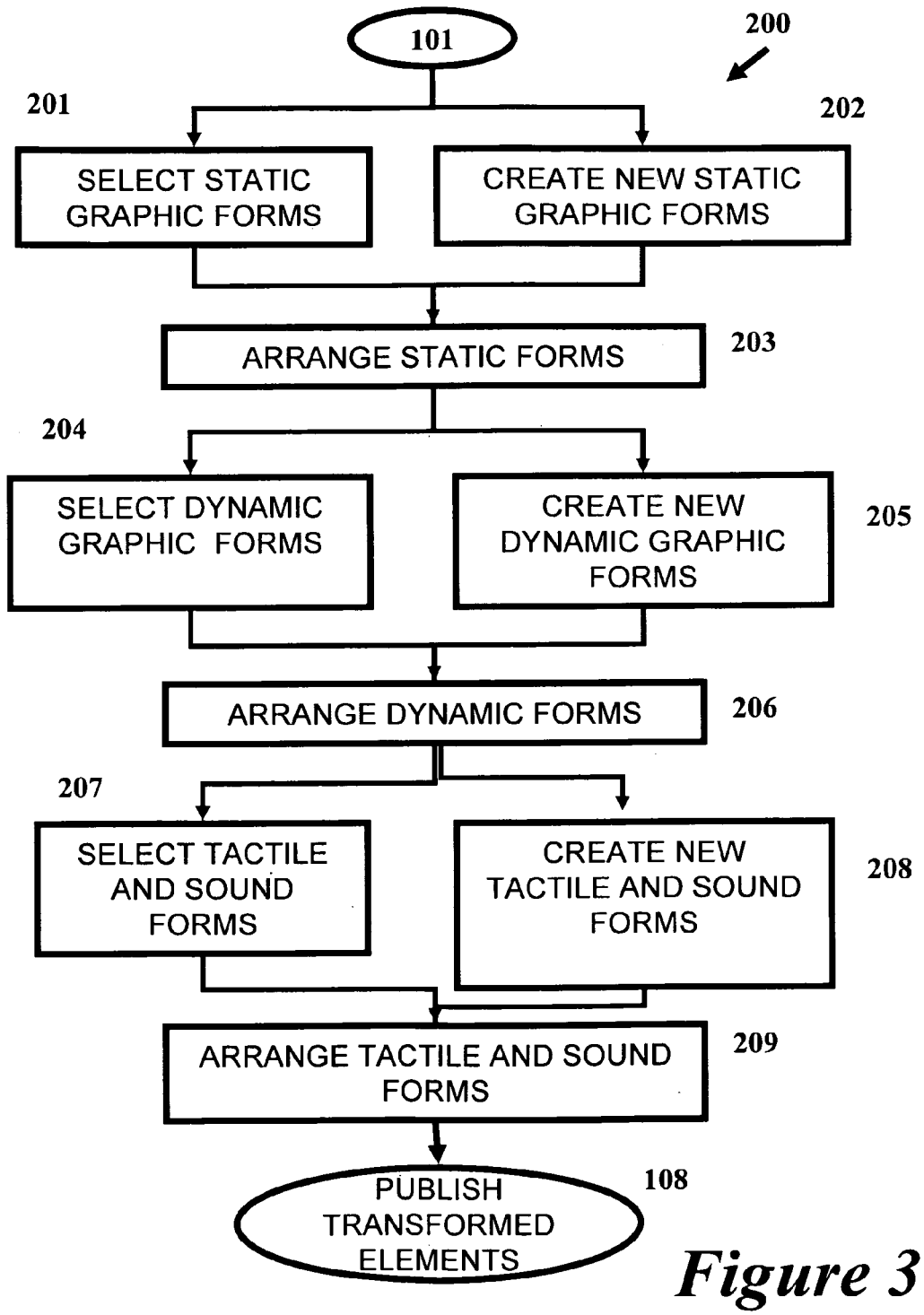
FIG. 3 shows an example process for transforming and displaying accounting and financial information in accordance with an embodiment of the invention.

In one embodiment, some or all of process 200 in FIG. 3 can be implemented to select at least one suitable form for each element. Process 200 is explained in further detail below.

Turning back to FIG. 2A, block 102 is followed by block 103, in which the developer selects one or more sub-elements for transformation. In this embodiment, each element may have any number of constituent components known herein as sub-elements. For example, the element "assets" may have sub-elements of cash, accounts receivable, inventory, property, plant & equipment, and other assets. In any instance, a developer can select any number of such sub-elements for transformation.

Block 103 is followed by block 104, in which the developer assigns each sub-element at least one form. Similar to block 102, in this embodiment, one or more existing or predefined graphic forms can be selected by the developer, such as in block 201 in FIG. 3, or a developer can create a new form, such as a static form in block 202 in FIG. 3. Example existing or predefined forms can include, but are not limited to, a static graphic, a moving graphic, a tactile form, a sound form, and any combination thereof. In any instance, at least one suitable form for each sub-element is selected.

Block 104 is followed by decision block 105, in which the developer determines if all the elements have been transformed. If not, the process 100 follows branch 106, in which the developer returns to block 102, in which at least one form for each element is selected based at least in part on the character of the information presented, and the process 100 continues. If at decision block 105 the developer determines all the elements that are to be displayed in the transformation are assigned forms, branch 107 is followed to block 108, in which the developer completes the transformation and publishes the associated information in the forms suitable for presentation.

At block 108, the process 100 ends.

In one embodiment, the decision block 105 can determine whether all the elements and sub-elements have been transformed. Similar to the process flow described above, if not, the process 100 can follow branch 106, in which the developer returns to block 102.

Figure 2B:
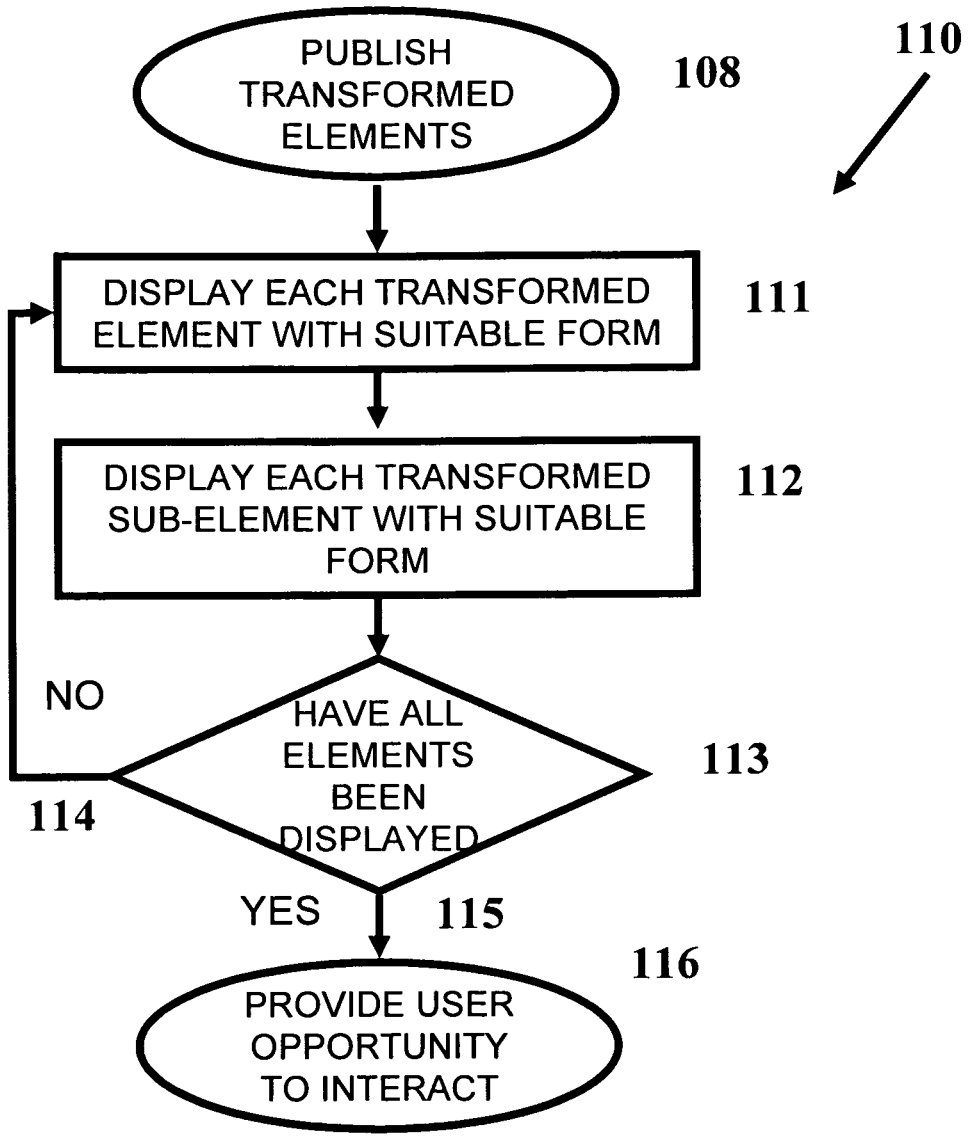

The process 110 illustrated in FIG. 2B begins at block 111, which can begin after block 108 of FIG. 2A. In block 111, each transformed element can be displayed or otherwise output with a suitable form. Block 111 is followed by block 112, in which each transformed sub-element can be displayed or otherwise output with a suitable form. Block 112 is followed by decision block 113, in which a determination is made whether all of the elements, and in some instances all of the sub-elements, have been displayed or otherwise output. If not, branch 114 is followed to block 111, where the process 110 continues. If so, branch 115 is followed to block 116, in which a user is provided an opportunity to interact with the output, presentation, or display. The process 110 ends at block 116.

In one embodiment, information published for presentation or otherwise output can be exported in a variety of ways, including printed pages of what is displayed on the screen, as is presented in the examples of FIGS. 7 and 8A-8H. In other examples, information can be output for presentation by way of modules that contain both the visual and sound information, which may be rendered by way of programs such as Adobe Flash™, Microsoft PowerPoint™, Microsoft Silverlight™, various suitable programming languages, and other outputs.

Referring to FIG. 3, process 200 can be implemented when the developer iterates through each element at block 102 of FIG. 2A, and through each sub-element at block 103. As shown, the process 200 begins at either block 201 or block 202 depending on the character of the information presented, which is evaluated at block 101. In block 201, the developer can select an existing or predefined static graphical form. In block 202, the developer can create a new static graphic form to transform the element or sub-element of information of interest. For example, for each static element or sub-element, or an element or sub-element that represents information as of a point in time, the developer can select at block 201 an existing or predefined static graphical form, or may create at block 202 a new static graphic form to transform the static element or sub-element of interest. In any instance, after the developer assigns each of the elements and sub-elements a particular respective static form, the static graphic forms are arranged at block 203 for presentation or output.

Block 203 is followed by either block 204 or block 205 depending on the character of the information presented, which is evaluated at block 101. In block 204, the developer can select existing or predefined dynamic graphic forms to transform the element or sub-element of information of interest. In block 205, the developer can create a new dynamic graphic form to transform the element or sub-element of information of interest. For example, a commercially available vector graphics software package can be used to create a new dynamic graphic form for an element and/or sub-element of interest. In any instance, after the developer assigns each of the elements and sub-elements a particular respective dynamic form, the dynamic graphic forms are arranged at block 206 for presentation or output. Thus, for each element that represents a point in time, a period of time, or some other state of information to be presented in the new form, the developer selects an appropriate static and/or dynamic form following the process just described. In a similar manner, the developer either selects, at block 207, existing or predefined tactile forms or sound forms, or creates, at block 208, new tactile forms or sound forms to express the transformed information. In any instance, after the developer assigns each of the elements and sub-elements a particular respective tactile form and/or sound form, the tactile forms and/or sound forms are arranged at block 209 for presentation or output.

After block 209, the process 200 ends, and the process 100 of FIG. 2A continues at block 108 of FIG. 2A, in which the developer completes the transformation and publishes the associated information in the forms suitable for presentation.

Figure 4A:
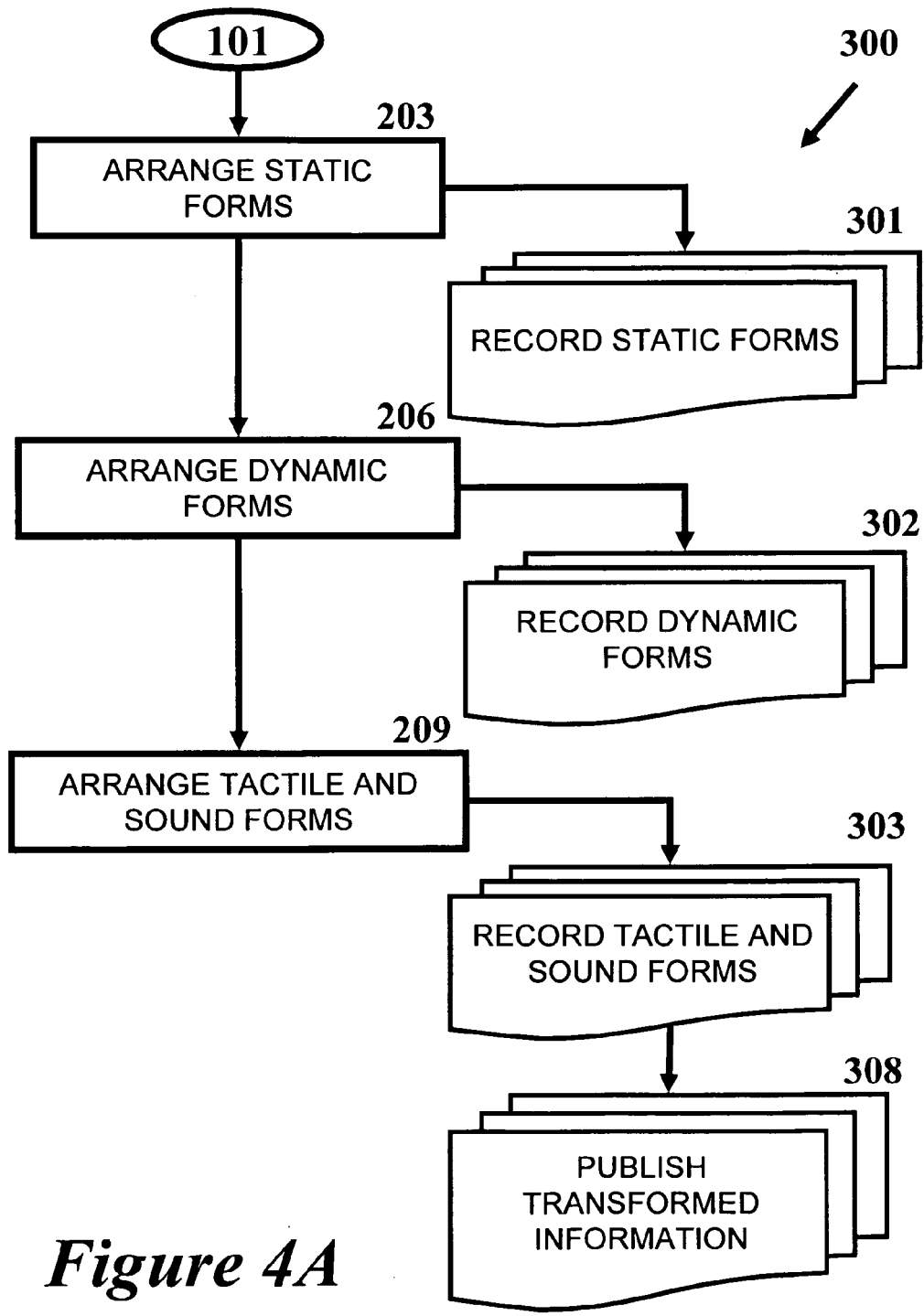
FIGS. 4A and 4B show example processes for transforming and displaying accounting and financial information in accordance with embodiments of the invention.
Figure 6:
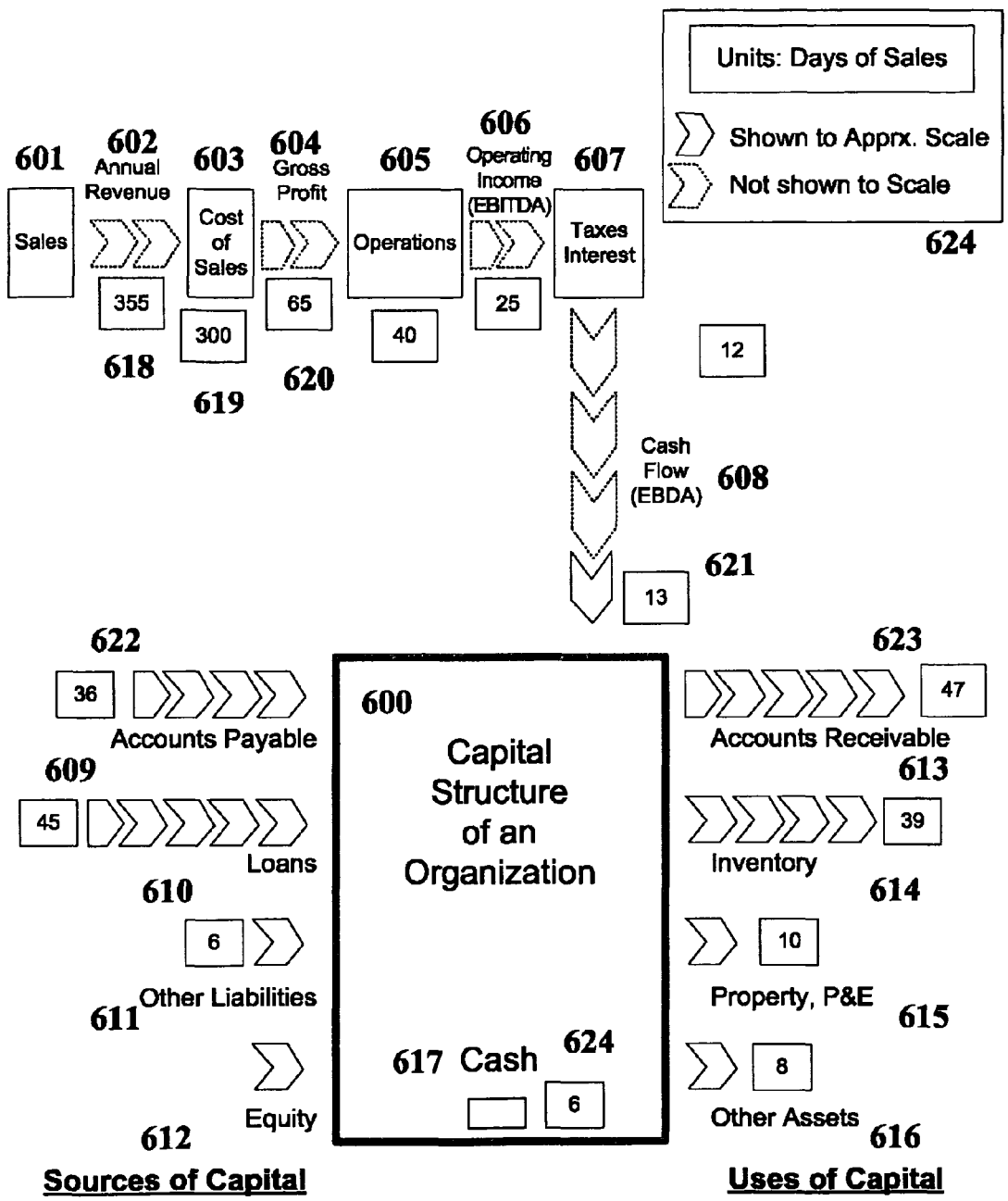
FIG. 6 shows an example presentation of transformed accounting and financial information in accordance with an embodiment of the invention.

In another embodiment, the process 200 described above in FIG. 3 can be supplemented by the process 300 in FIG. 4A, wherein each of the forms is arranged in the presentation and manually recorded. For example, during or after the arrangement of each of the static forms, dynamic forms, and tactile and/or sound forms, each of the static forms, dynamic forms, tactile forms and/or sound forms can be manually recorded, such as on paper, for instance, as shown in FIG. 6, to increase comprehension of a non-financial user. In this embodiment, a developer can display the relationship between sources of capital and uses of capital for an organization, such as 600 in FIG. 6, and a set of relationships that are frequently difficult for a non-financial user to grasp from examining conventional financial statements, such as those in FIGS. 1A, 1B and 1C.

One aspect of the transformation of accounting and/or financial information to a particular form, such as a static form, dynamic form, tactile form and/or sound form, is increased user comprehension of what contributes to cash associated with an organization. For example, in accordance with an embodiment of the invention, a developer may start with a common conventional financial report, or the balance sheet, also called a statement of financial position, an example of which is illustrated in FIG. 1B. The developer may want to show the impact of various operations of the organization which contribute to cash flow 608 associated with the organization 600, the information for which is derived from another standard conventional financial statement, the income statement, also called a statement of profit and loss, an example of which is illustrated in part in FIG. 1A. Note that the partial income statement and partial balance sheet illustrated in FIGS. 1A and 1B are not the same income statement and balance sheet the developer used in transforming the presentation illustrated in FIG. 6.

Using the process 200 of FIG. 2A, the developer can select as elements and/or sub-elements of the income statement certain operating functions of the organization that create the resultant cash flow 608, such as sales 601, cost of sales 603, operations 605, and the payment of taxes and/or interest 607. Certain intermediate financial steps, such as revenue 602, gross profit 604, operating income (earnings before interest, taxes, depreciation, and amortization) 606, can also be selected by the developer for transformation and display.

Furthermore, using the process 100 of FIG. 2A, the developer can select as elements and/or sub-elements of the balance sheet certain components of liabilities for many organizations, such as accounts payable 609, loans 610, and the catch-all liability category, other liabilities 611. The developer can also select certain equity 612 as a single category, and other major components of assets, such as accounts receivable 613, inventory 614, and property, plant, and equipment 615, as well as the asset catch-all, other assets 616, for transformation and display. Furthermore, the developer can select the remaining asset cash 617, since cash 617 can be a relatively important financial sub-element to be highlighted for the user. By selecting certain assets, assets, and equity, including current cash flow, for transformation, the developer can maintain suitable accounting information to display in a presentation, which preserves the basic equation of accounting, that is, "assets=liabilities+equity."

Thus, using the process 100 illustrated in FIG. 2A, the developer can determine that the sub-elements 602-608 related to the income statement may measure information over a period of time, such as a month, quarter, or year, and the sub-elements 609-617 related to the balance sheet are measurements at a point in time, typically the last day of the period of the income statement.

Furthermore, using the process 100 illustrated in FIG. 2A and the process 200 in FIG. 3, the developer selects either an existing static form in block 201 of FIG. 3, or determines whether to create a new static form in block 202 to present or otherwise output the transformed information. In the presentation of FIG. 6, new forms were not created but instead were selected from existing or predefined forms. The presentation shown in FIG. 6 does not include dynamic forms, tactile forms, or sound forms, but in other embodiments some of all of such forms could be used. For instance, the developer assigned each sub-element to a particular graphic form in block 104 of FIG. 2A, and arranged the transformed static graphic forms in block 203 of FIG. 3, and manually recorded each static form in block 301 of FIG. 4A, such as on paper. After all sub-elements and elements were assigned for static presentation, the developer completed the transformed presentation, and published the transformed presentation in block 108 of FIG. 2A.

In the example presentation illustrated in FIG. 6, the developer selected a relatively large rectangle 600 or similar static form to represent the capital structure of the organization, relatively smaller rectangles or other similar static forms were selected to represent respective operations 603, 605, and 607 in the organization that expend cash, and the graphical open arrows 624A, 624B or similar static forms were selected to illustrate the flow of cash. In this example, the developer selected graphical arrows with broken borders 624B to illustrate certain flows of cash that were not to scale, and graphical arrows with solid borders 624A where the individual graphic is approximately to scale with certain cash flows. The developer placed cash flows 601-607, 622 that flow into the organization 600 above and to the left side with respect to the organization 600 with arrows 608-612 generally pointing towards the organization (or capital structure of the organization). Cash flows that flow out from the organization 600 were positioned adjacent the right side of the organization 600 with arrows 613-616 generally pointing away from organization 600 (or capital structure of the organization). Cash that remains in the organization 617 is shown in a small rectangle to symbolize that cash exists in or is associated with the organization 600.

In the example shown, the developer used "dollars," the measurement unit of the original conventional financial statements, to calculate the scale for the cash flows to be shown to approximate scale: the cash flow 608 measure and the balance sheet items 609-617. After implementing some or all of the process 300 in FIG. 4A, the completed presentation shown in FIG. 6 can be published as a paper-type presentation.

Figure 4B:
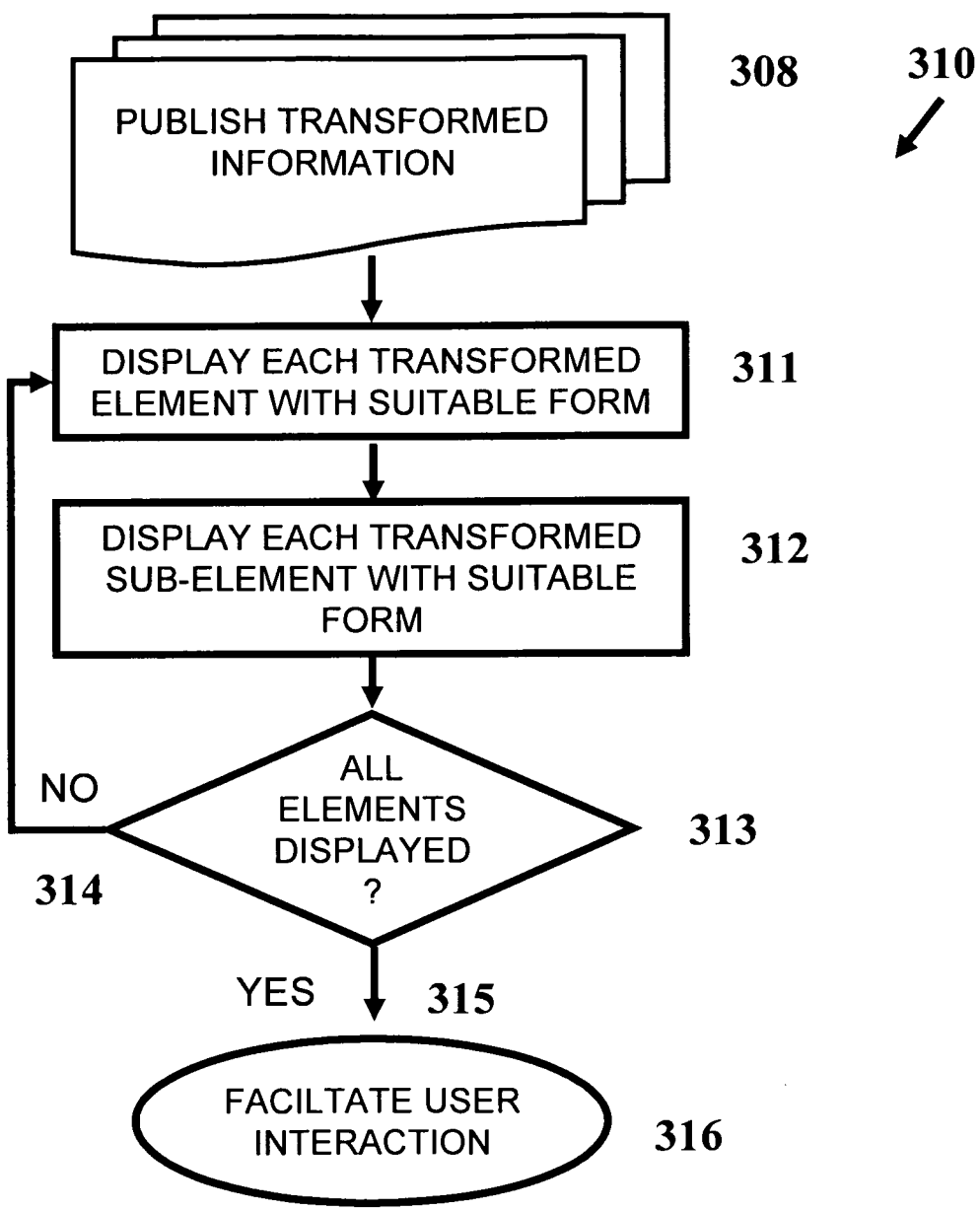

In one embodiment, FIG. 4B illustrates a supplemental process 310 to publish a presentation, such as a paper-type presentation. FIG. 4B is described in detail below.

Figure 8:
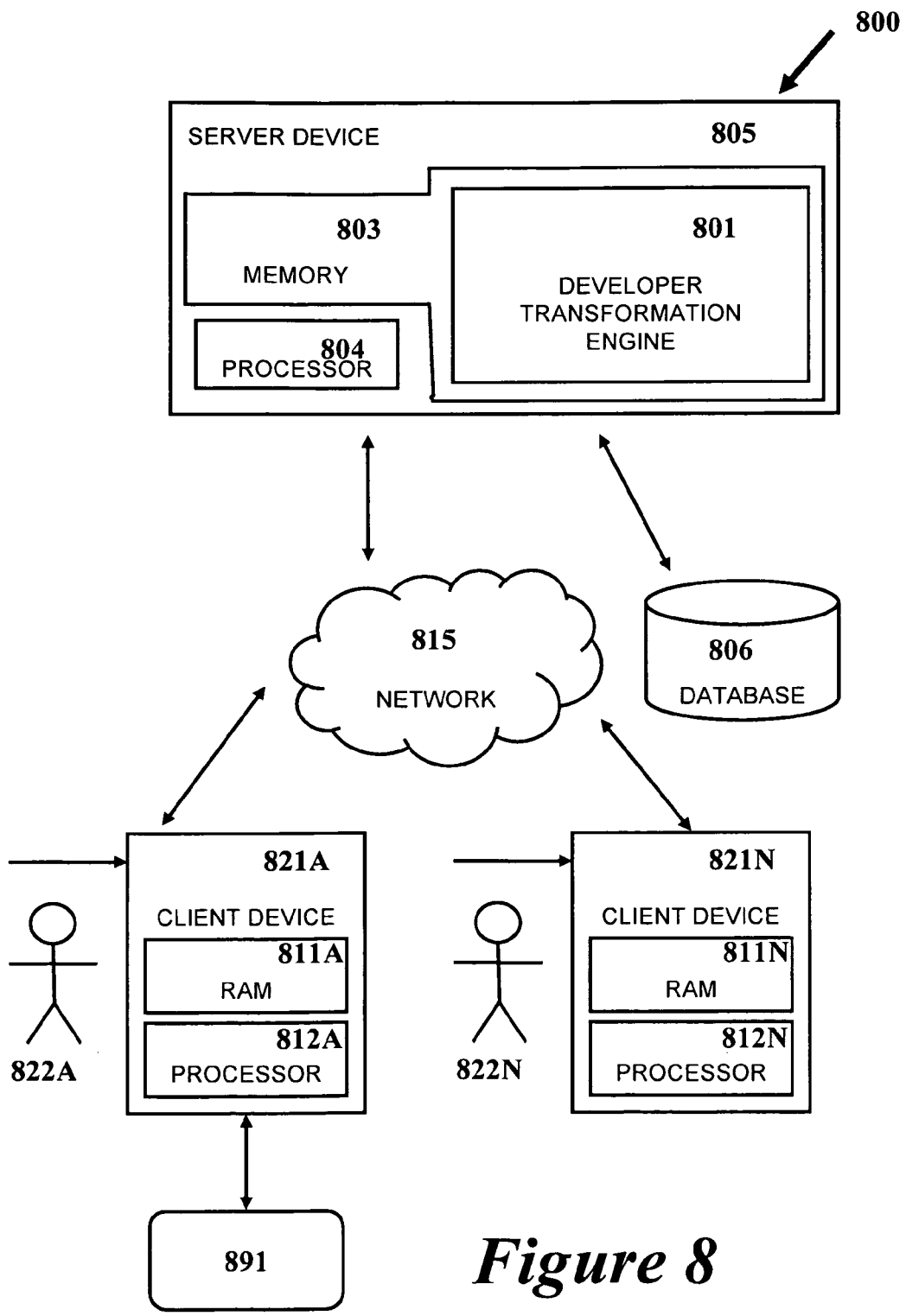
FIG. 8 shows an example system for transforming and displaying accounting and financial information in accordance with an embodiment of the invention.

In one embodiment, after a developer arranges the selected forms associated with the accounting and financial information, any number of static forms, dynamic forms, graphical, tactile, and sound transformations can be stored for subsequent retrieval from a database, such as 806 in FIG. 8, memory such as 803, or any other data storage device.

Figure 5:
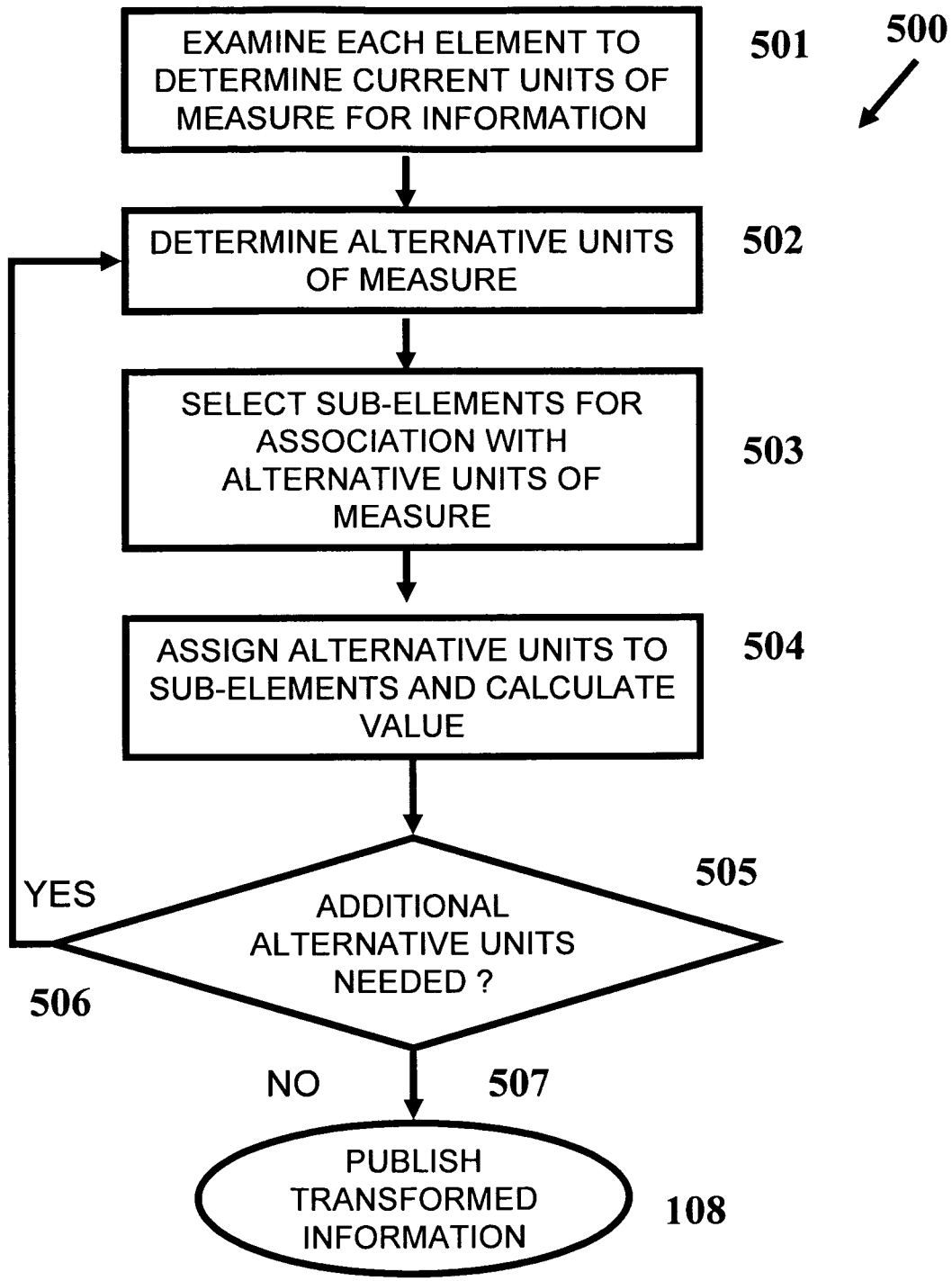
FIG. 5 shows an example process for transforming and displaying accounting and financial information in accordance with an embodiment of the invention.

FIG. 5 illustrates another embodiment for transforming and displaying accounting and financial information to provide increased user comprehension. In this embodiment, a process 500 utilizes a transformation to highlight the impact of certain cash flows on the cash or cash position of an organization, such as cash 617 of organization 600 in FIG. 6, including a measure of cash flow 608 (earnings before the non-cash items of depreciation and amortization) indicating certain uses of the organization's capital. Using the process 500, certain alternative units of measure for some or all of the cash flows can be determined by way of transforming current units of measure, and the alternative units of measure can be associated with the respective cash flows for display or output.

The process 500 begins at block 501, in which each element is examined to determine the current units of measure for the associated accounting and financial information.

Block 501 is followed by block 502, in which an alternative unit of measure is determined for some or all of the current units of measure associated with each element. In the embodiment shown in FIG. 5, a developer determined an alternative unit of measure for cash in the organization as a number of "days of sales", such as 624, as a suitable alternative unit of measure for display. In this example, the term "days of sales" can be applied as a measure of accounts receivable "days of sales outstanding." This can be a useful alternative unit of measure employed with each transformed element that can help place other financial units of measure into perspective. In other embodiments, other suitable alternative units of measure can be determined, such as hours of sales, months of sales, and years of sales.

Block 502 is followed by block 503, in which sub-elements are selected for association with each alternative unit of measure. In the embodiment shown in FIG. 5, at least one sub-element is associated with each determined alternative unit of measure. For example, as shown in FIG. 6, the developer selected alternative units of measure for sub-elements 602-617, thus transforming the current units of measure for each respective sub-element 602-617 to a more suitable unit of measure for display and output.

In one aspect of this embodiment, the alternative unit of measure "days of sale" can be calculated by dividing the dollar amount for each sub-element, such as 602, by the annual revenue amount, and multiplying by 365, the number of days in a year. The result is that an alternative unit of measure for annual revenue 602, or "365" days 618 as shown in FIG. 6. Other financial measures can be expressed in similar alternative units of measure, such as cost of sales 603, which is shown as "300" days 619 in FIG. 6. Since the use of alternative units of measure in this embodiment are ratios with annual sales as the denominator, all of the certain elements, such as 609-617, can be displayed at an approximate scale which is representative of their approximate relative ratios to each other.

Block 503 is followed by block 504, in which alternative units of measure are assigned to the sub-elements, and the value of each alternative unit of measure is calculated. In the embodiment shown in FIG. 5, the developer can assign the alternative units of measure, such as "days of sale", to each sub-element, such as 602-618, and calculate the value as described in the preceding paragraph.

Block 504 is followed by decision block 505, in which the developer determines whether additional alternative units of measure are needed for additional comprehension. If so, then branch 506 is followed back to block 502, described above and the method 500 continues from block 502. In this instance, the developer can iterate the process 500 and select another alternative unit of measure, such as "days of cash flow" for some or all of the sub-elements of interest. Returning to decision block 505, if no additional alternative units of measure are needed for facilitating comprehension of some or all of the sub-elements of interest, and the method 500 continues to block 108 of FIG. 2A, in which the presentation is published or otherwise output for display.

In one embodiment, a process can transform accounting and financial information into one or more sound forms to facilitate comprehension. The construction and display of such sound forms can improve comprehension of the associated accounting and financial information for certain users, such as persons with limited sensory perception, i.e., the visually impaired. Thus, with reference to FIG. 2A, as a developer examines each element to determine the nature of the accounting and/or financial information in each element, as in block 101, the developer may select sound forms for all elements of interest in block 102. Through the selection of sub-elements for transformation in block 103, and assignment of each sub-element to a particular sound form in block 104, the developer can select either existing or predefined sound forms or can create new sound forms to represent each sub-element, as shown in respective blocks 207 and 208 of FIG. 3. For example, certain sound forms can represent varying degrees of categorization, sequencing, magnitude, and direction, of each sub-element or cash flow, such as by a relatively simple or complex sound. As shown in block 209, the developer can arranges the selected or created sounds and can manually record the respective values, as shown in block 303 of FIG. 4A, using a suitable sound and/or music scoring notation. In any instance, the developer can publish the presentation as shown in block 308.

In one embodiment, display or output of the presentation can be implemented by the process 310 shown in FIG. 4B. The process 310 of FIG. 4B begins at block 308, in which published transformed elements and sub-elements are provided. Block 308 is followed by block 311, in which each transformed element is displayed or otherwise output. Block 311 is followed by block 312, in which each transformed sub-element is displayed or otherwise output. Block 312 is followed by decision block 313, in which a determination is made whether all elements, and in certain instances all sub-elements, have been displayed. If not, then branch 314 is followed back to block 311 described above, and the process 310 continues. If so, then branch 315 is followed to block 316, in which a user is provided an opportunity to interact with the display or output. The process 310 of FIG. 4B ends at block 316.

In one embodiment, accounting and financial information can be transformed to sound forms, and sound can be used to increase comprehension of the information. These sounds can be made to vary (frequency, timbre, etc.) in response to the changing values of capital flow by associating specific sounds with specific accounting and financial elements and sub-elements through the functions of a developer transformation engine, such as 801 in FIG. 8, a digital audio workstation application, or a special purpose computer system. The resulting presentation can be a "sound picture" that reinforces the visual picture. A "melody" produced by certain combinations of sounds can signify a certain set of individual financial events which may occur at the same time. Each element or sub-element can be associated with a particular sound, such that synthesized or sampled sequences of specific musical instruments can uniquely represent each element or sub-element. For example, revenue could be depicted as bass drum, gross profit as a bass guitar, operating income (EBTDA) as a saxophone, and cash flow (EBDA) as a rhythm guitar. As the underlying accounting and financial information changes, the notes, tempo, and amplitude of the sequenced musical instruments changes, providing a "song" or "sound picture" of the information changes that reinforces the visual picture. Providing visual graphic information, such as on a computer screen or video display, combined with the "sound picture" described herein and/or the tactile forms described below, can provide multiple displays of the same information, thereby providing the opportunity for greater user comprehension of the underlying accounting and financial information.

In one embodiment, a process can transform accounting and financial information into one or more tactile forms to facilitate comprehension. The construction and display of such tactile forms can improve comprehension of the associated accounting and financial information for certain persons, such as persons with limited sensory perception, i.e., the visually impaired. Thus, with reference to FIG. 2A, as a developer examines the nature of the accounting and/or financial information in each element, such as in block 101, the developer may select tactile forms for all elements of interest in block 102. Through the selection of sub-elements for transformation in block 103, and assignment of each sub-element to a particular tactile form in block 104, the developer 207 can select either existing or predefined tactile forms, or can create new tactile forms to represent each sub-element, as shown in respective blocks 207 and 208 of FIG. 3. For example, certain tactile forms can represent varying degrees of the categorization, sequencing, magnitude, and direction, of each sub-element or cash flow, such as by a relatively simple or complex tactile feedback mechanism. For example, suitable tactile forms can be those manufactured by InTouch Graphics of St. Paul, Minn. As shown in block 209, the developer can arrange the tactile forms, and can manually record the respective values, as shown in block 303 of FIG. 4A, using a suitable tactile form device. In any instance, the developer can publish the presentation as shown in block 308.

In one embodiment, display or output of the presentation can be implemented by the process 310 shown in FIG. 4B described above.

In one embodiment, accounting and financial information can be transformed into one or more tactile forms that can be displayed on a tactile feedback device, such as 891 in FIG. 8. For example, tactile representation of a third or physical dimension can utilize a device or an apparatus that is comprised of two-dimensional grid of micro-plungers or other devices, each of which can extend up or down in the third dimension ("Z"), with the height of the micro-plunger or other device representing the value of the third dimension, much as color might represent a third dimension in a two-dimensional graphic presentation (X and Y), or a fourth dimension in a three-dimensional graphic. In this example, the plungers can move up or down over time, allowing for a dynamic presentation of the underlying financial information. The tactile feedback display device could be programmed to provide a three dimensional display for the financial information. A small unit just larger than a human hand could display a topographic representation of the flow models referenced in the previous paragraph, with the X and Y dimensions representing the same flow elements depicted on the screen, video display, or printed page, and the values represented by the vertical Z dimension by very small rods rising from the device in proportion to the value. In this fashion, the user (especially a visually impaired user) could sense the dynamic changes in the flow model. By pressing a key at the top of the device, the display could drill-down into more detail.

In another embodiment, a system and process can transform a presentation with accounting and financial information, and electronically record the transformed presentation. For example, a system 800 shown in FIG. 8 can implement an associated process, such as 100 in FIG. 2A, utilizing a developer transformation engine, such as 801. In other embodiments, the system 800 can implement other processes described herein, for instance, processes shown and described with respect to FIGS. 2B, 3, 4A, 4B, and 6. The developer transformation engine shown in FIG. 8 can be a set of computer-executable instructions stored in a memory, such as 803, and operable to execute via a processor, such as 804. The developer transformation engine 801, memory 803, and processor 804 can be located at or otherwise accessible via a computer server or server device, such as 805. In one embodiment, a database 806 or other data storage device can be in communication with the server device 805, and can be electronically accessed by the server device 805 either through a network 815 or by direct communication. Any number of other server devices can also be in communication with the network 815. Through the network 815, or by direct communication, one or more client devices such as 821A-N can communicate with the developer transformation engine 801 and server 805. In the embodiment shown, a user, such as 822A can utilize a particular client device 821A to communicate with or otherwise interact with the developer transformation engine 801 and server 805. Each client device 821A-N can include a respective memory 811A-N and processor 812A-N, and in certain instances, may include computer-executable instructions similar to those of the developer transformation engine 801. In most instances, each of the client devices 821A-N can include an associated output device, such as a display, for outputting one or more presentations generated by the developer transformation engine 801.

Each client device 821A-N can be a computer or processor-based device capable of communicating with the communications network 815 via a signal, such as a wireless frequency signal or a direct wired communication signal. Client devices 821A-N may also comprise a number of other external or internal devices such as a mouse, a CD-ROM, DVD, a keyboard, a display, printer, printing device, output display, display screen, a tactile device, a speaker, or other input or output devices. For example, a client device such as 821A can be in communication with an output device via a communication or input/output interface. Examples of client devices 821A-N are personal computers, mobile computers, handheld portable computers, digital assistants, personal digital assistants, cellular phones, mobile phones, smart phones, pagers, digital tablets, desktop computers, laptop computers, Internet appliances, and other processor-based devices. In general, a client device, such as 821A, may be any type of processor-based platform that is connected to a network, such as 815, and that interacts with one or more application programs. Client devices 821A-N may operate on any operating system capable of supporting a browser or browser-enabled application including, but not limited to, Microsoft Windows®, Apple OSX™, and Linux. The client devices 821A-N shown include, for example, personal computers executing a browser application program such as Microsoft Corporation's Internet Explorer™, Netscape Communication Corporation's Netscape Navigator™, and Apple's Safari™, and Mozilla Firefox™.

In one embodiment, suitable client devices can be standard desktop personal computers with Intel x86 processor architecture, operating a Microsoft® Windows® operating system, and programmed using a Java language.

Server 805, each depicted as a single computer system, may be implemented as a network of computer processors. Examples of suitable servers are server devices, mainframe computers, networked computers, a processor-based device, and similar types of systems and devices.

Suitable processors for client devices 821A-N, and a server 805 may comprise a microprocessor, an ASIC, and state machines. Example processors can be those provided by Intel Corporation and Motorola Corporation. Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor, such as the processors 812A-N, with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

The network 815 shown in FIG. 8 can be, for example, the Internet. In another embodiment, the network 815 can be a wireless communications network capable of transmitting both voice and data signals, including image data signals or multimedia signals. Other types of communications networks, including local area networks (LAN), wide area networks (WAN), a public switched telephone network, or combinations thereof can be used in accordance with various embodiments of the invention.

Any number of users, such as 822A-N, can interact with a respective client device, such as 821A-N, via any number of associated input and output devices such as an output display device, keyboard, tactile device, speaker, and a mouse. In this manner, a user 822A can access one or more presentations or webpages located on or otherwise generated by a server, such as 805, via an Internet browser application program operating on a client device, such as 821A.

One may recognize the applicability of embodiments of the invention to other environments, contexts, and applications. One will appreciate that components of the system 800 shown in and described with respect to FIG. 8 are provided by way of example only. Numerous other operating environments, system architectures, and device configurations are possible. Accordingly, embodiments of the invention should not be construed as being limited to any particular operating environment, system architecture, or device configuration.

Figure 7A:
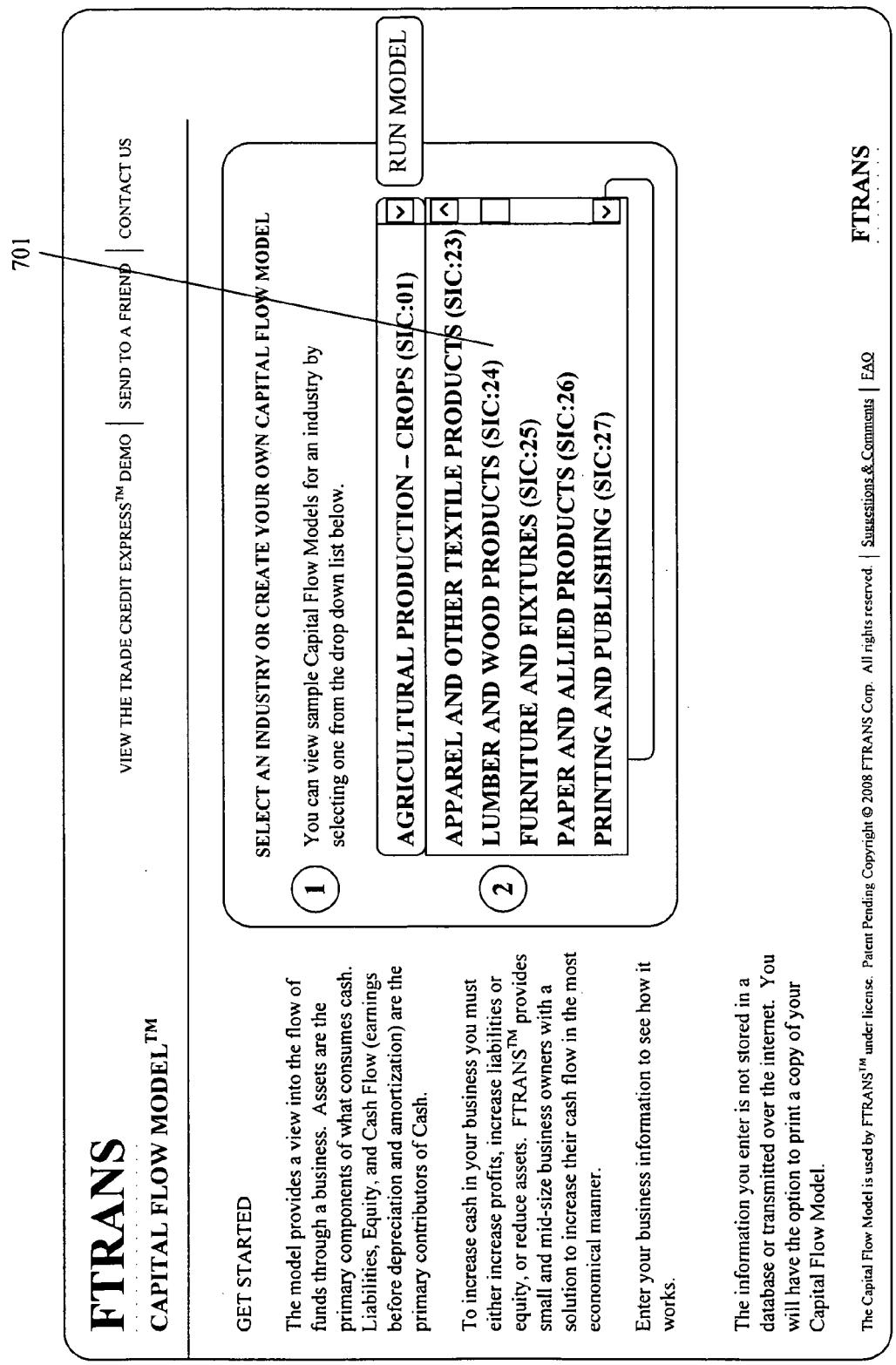

Example webpages and associated presentations are illustrated in FIGS. 7A to 7H. Each of the webpages and associated presentations are exemplary output from a developer or developer transformation engine, such as 801 in FIG. 8. The webpages and associated presentation in FIGS. 7A to 7H can be implemented by the system 800 shown in FIG. 8. In the embodiment shown in FIGS. 7A to 7H, the transformed accounting and financial information in the presentation better illustrates the role that accounts receivable contribute to cash. In FIG. 7A, a dropdown menu can be used in a webpage to select one or more Standard Industrial Classification (SIC) codes 701 associated with publicly listed companies. Each of the SIC codes 701 can be associated with at least one model, such as a capital flow model. Each model can provide a graphical view of the flow of certain cash flows through a business. In one embodiment, one or more predefined models can be stored in a database, such as 806 in FIG. 8, memory such as 803, or any other data storage device, for access by a developer transformation engine 801. In any instance, in response to user selection of a SIC code corresponding to the desired business type, such as SIC code 25 for furniture and fixtures, a corresponding model can be generated or otherwise provided on a subsequent webpage, such as in FIG. 7B. Other SIC codes can include, for example, SIC code 1: agricultural production, SIC code 23: apparel and other textile products, SIC code 26: paper and allied products, and SIC code 27: printing and publishing.

Figure 7B:
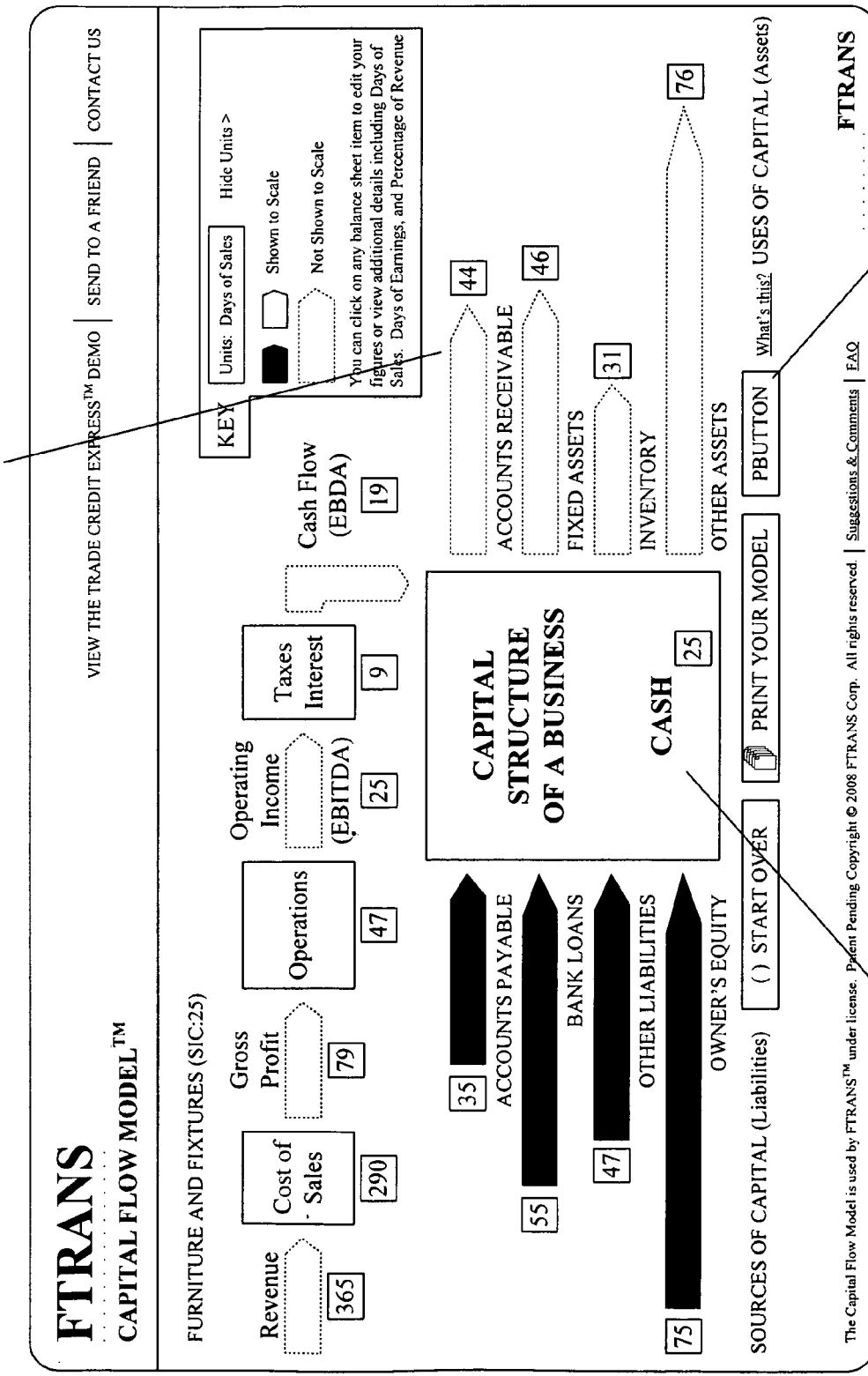
Figure 7C:
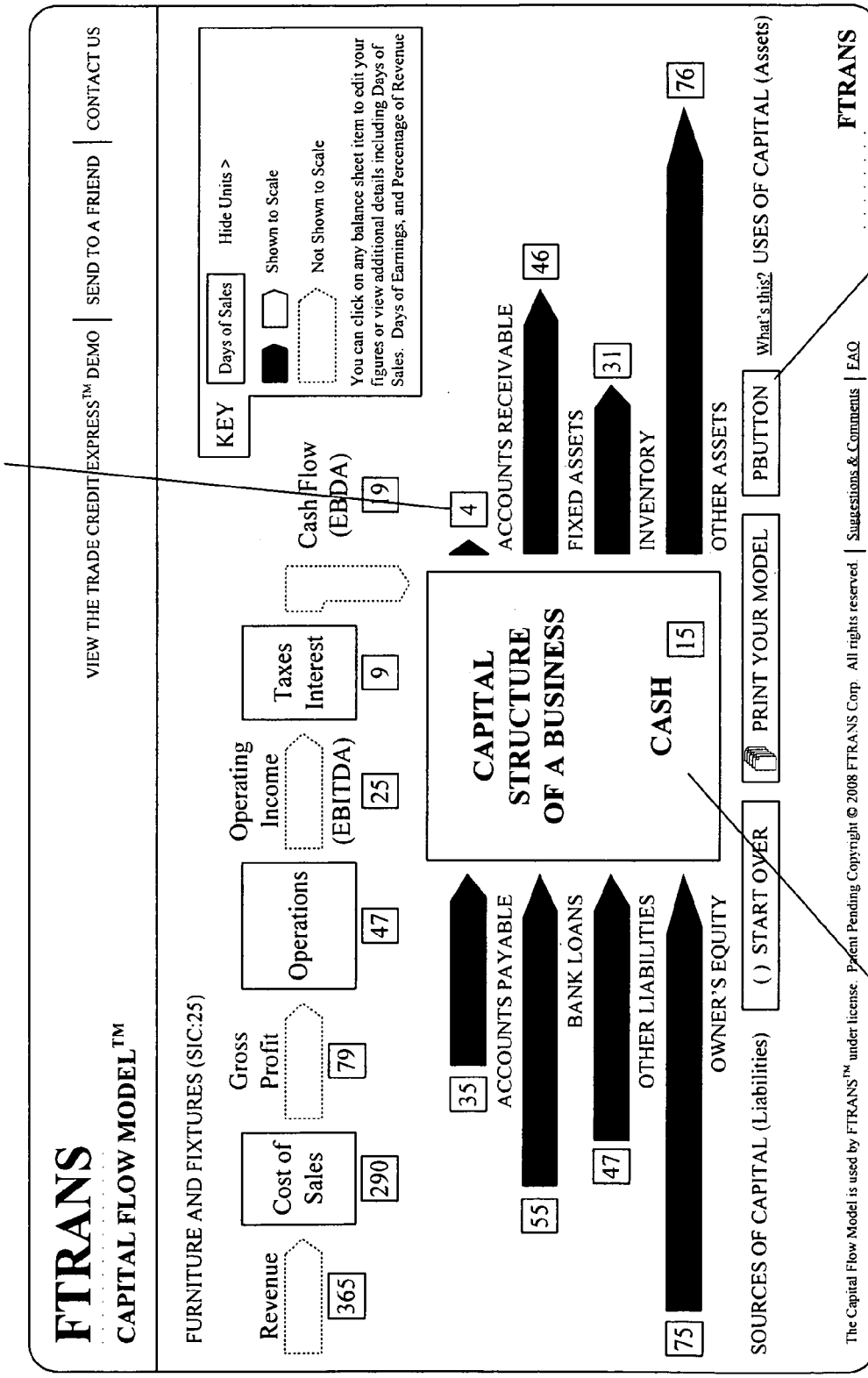

As shown in FIGS. 7B and 7C, a model such as a capital flow model for a selected SIC code or type of business is displayed on a webpage. In the embodiment shown in FIGS.

7B and 7C, the model shown can include various forms, such as static and/or dynamic forms, which represent respective cash flows associated with the selected type of business. In this example, the state of various aggregated data for publicly listed furniture and fixture manufacturers (SIC code 25) can be illustrated in various graphical forms, such as solid arrows, inflow arrows, different sized boxes or geometric shapes, outflow arrows, and solid line arrows. As shown in FIG. 7B, the average "accounts receivable" can be displayed as a solid line, outflow arrow 712 with an associated unit of measure, such as "44 days of sales" illustrated by a rectangular box with a number "44" within the box. The "cash" can be displayed within the organizational structure box 713 as a relatively smaller box with an associated unit of measure, such as "15 days of sales", illustrated by the number "15" within the smaller box. Through use of a "F Button," 711, a user can enter a command to calculate the associated capital structure as a result of a set of conditions, such as a service provided to certain business customers by FTRANS Corp. As shown in FIG. 7C, an updated model is displayed, and the user sees the result of the application of the set of conditions, such as the service offered by FTRAN Corp., where "accounts receivable" are shown by 722 as reduced to "4 days of sales", and "cash" 723 is shown as increased to "55 days of sales." In this manner, a user can readily comprehend certain accounting and financial information using the selected forms and associated units of measure provided in a presentation. Certain users can rapidly grasp and demonstrate to current and/or prospective business customers the value of certain sets of conditions and/or business services offered.

Figure 7D:
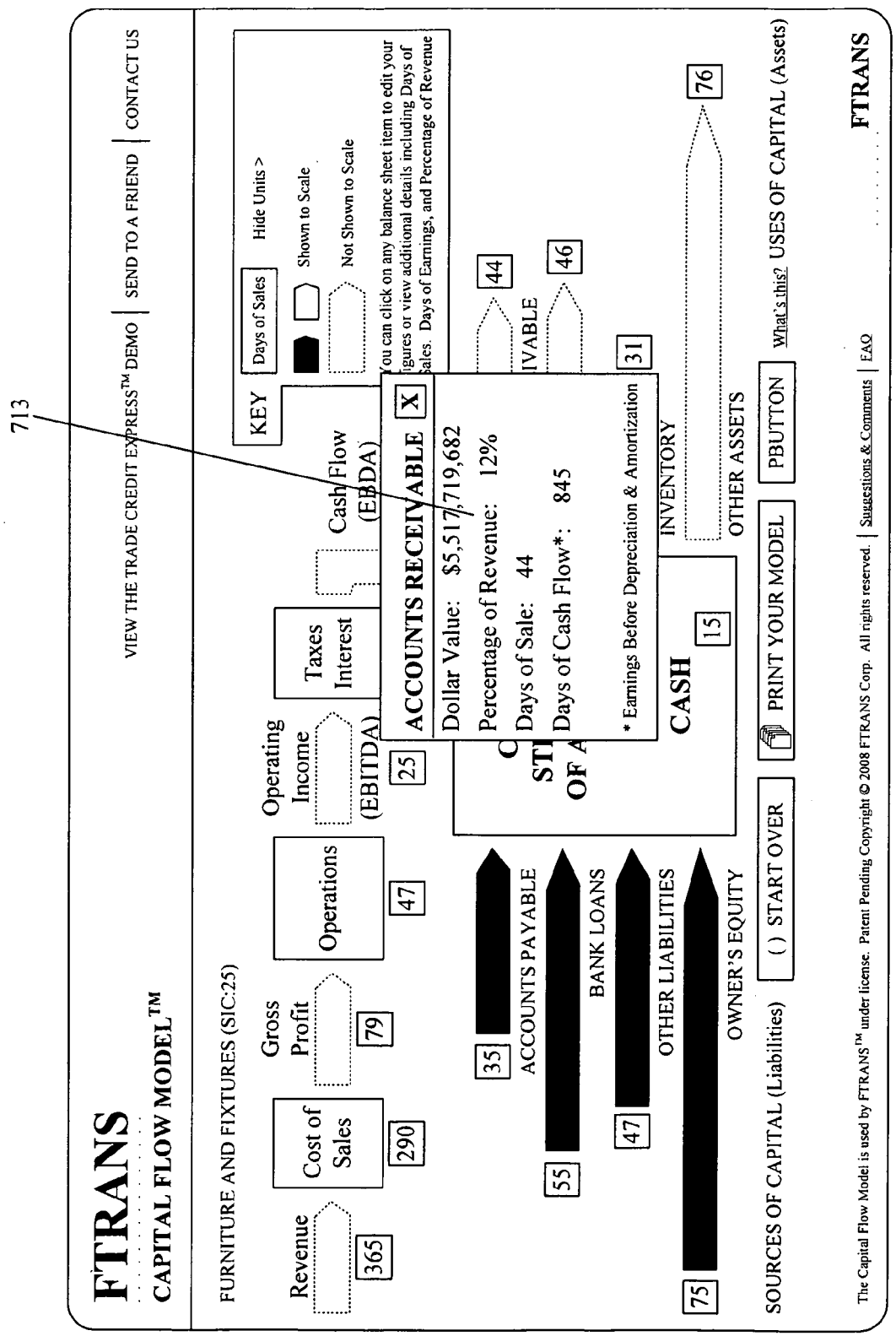
Figure 7F:
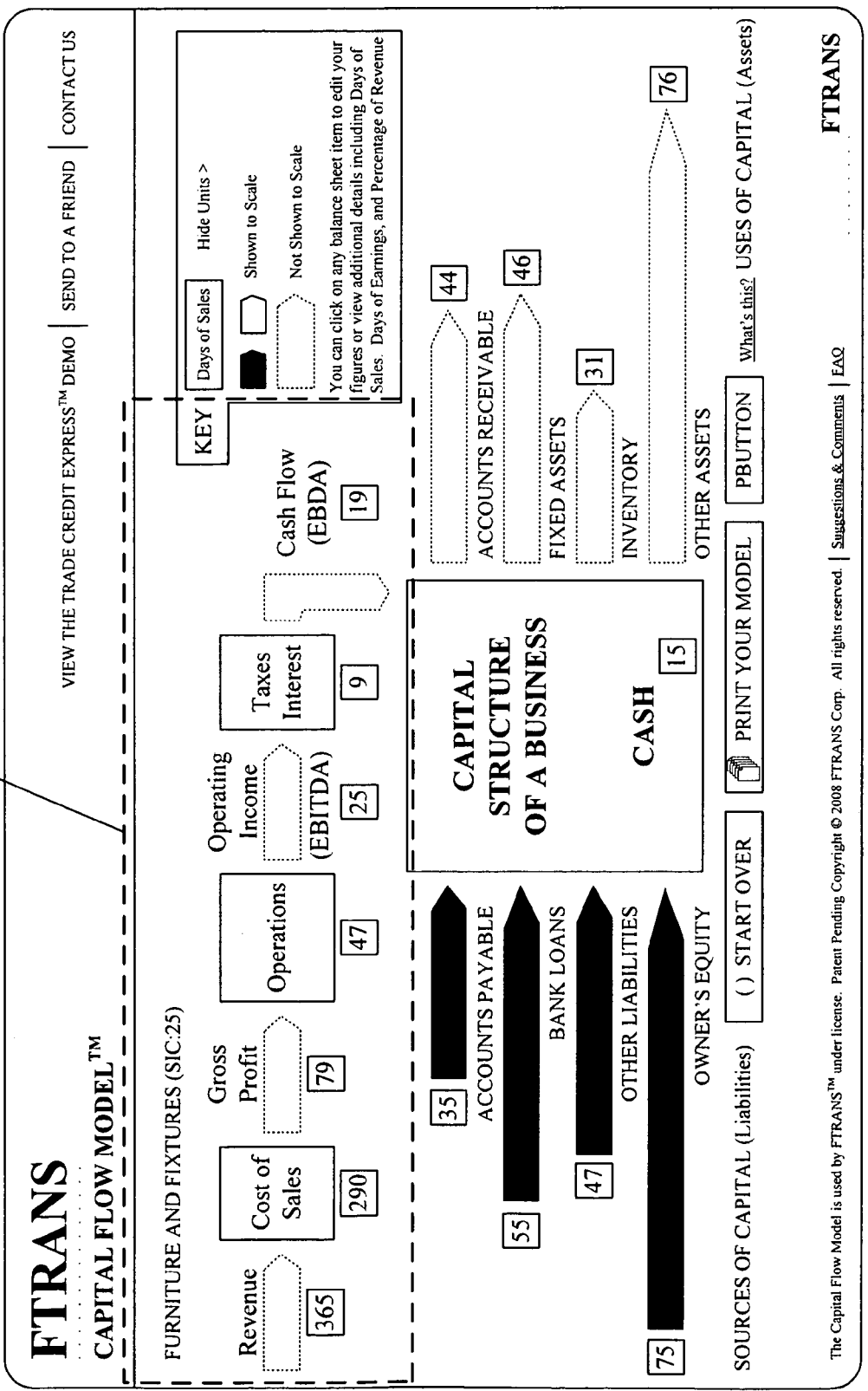

In FIG. 7D, a popup window 731 can provide a summary of certain updated model information. As a user uses a mouse or other input/output device to scroll across certain elements on the model, any number of popup windows or other devices can become available for accessing summary information for the user. When the user, for instance, double clicks or right clicks on certain portions of the model, a popup window with certain associated summary information can appear over a portion of the model.

In one embodiment, a user can enter various accounting and financial data to be transformed and presented similar to FIGS. 7B and 7C. For example, as shown in FIG. 7E, a webpage with a balance sheet 741 can be presented to user to input or otherwise enter various accounting and financial data to be transformed and presented in various forms similar to those shown in FIGS. 7B and 7C.

In one embodiment, the transformed graphical, audible, or tactile accounting and/or financial elements for one organization can be compared to the same transformed elements of another organization or to the aggregate elements for a group of organizations, such as all the publicly listed companies in an industry, and presented in various forms.

Figure 7G:
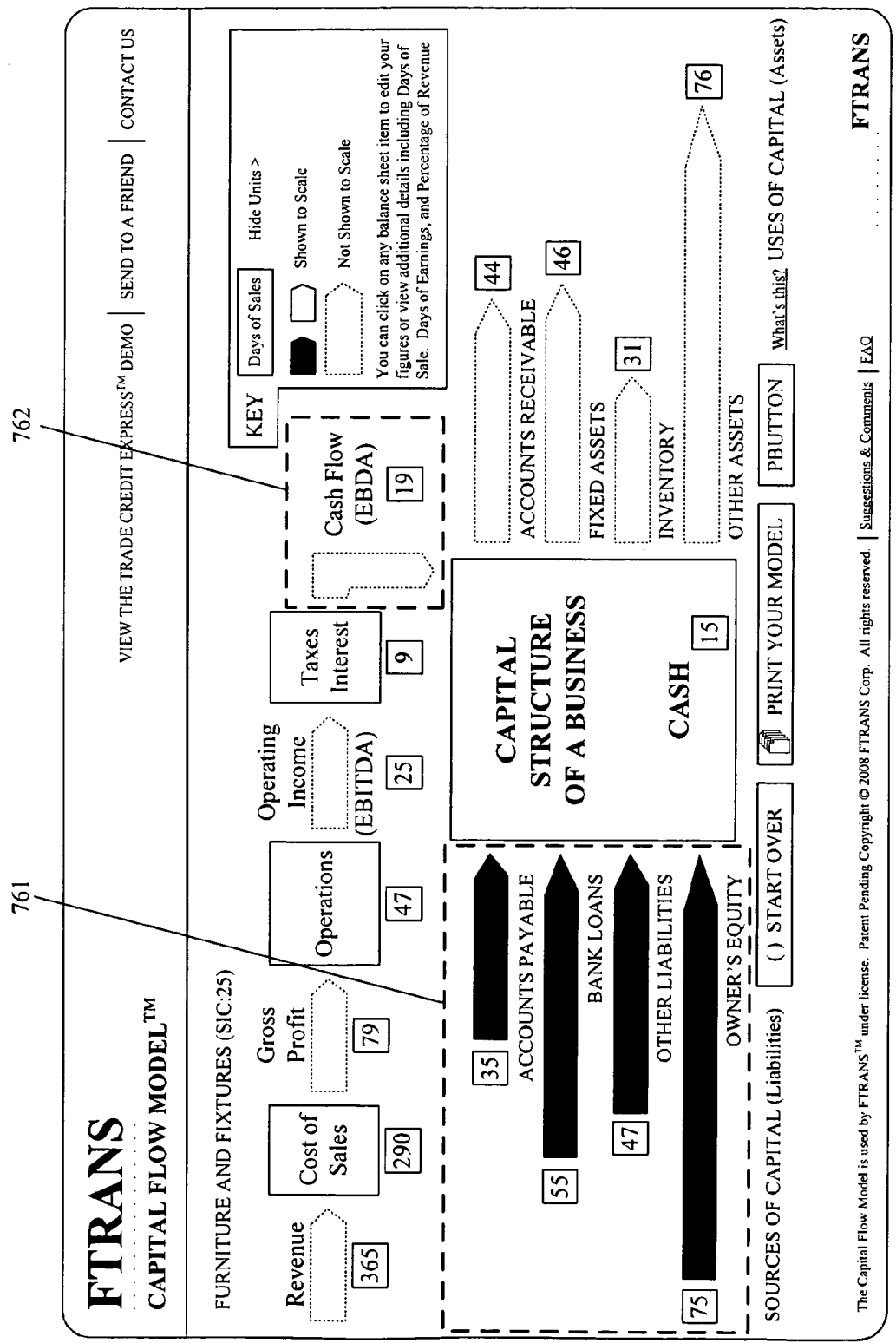
Figure 7H:
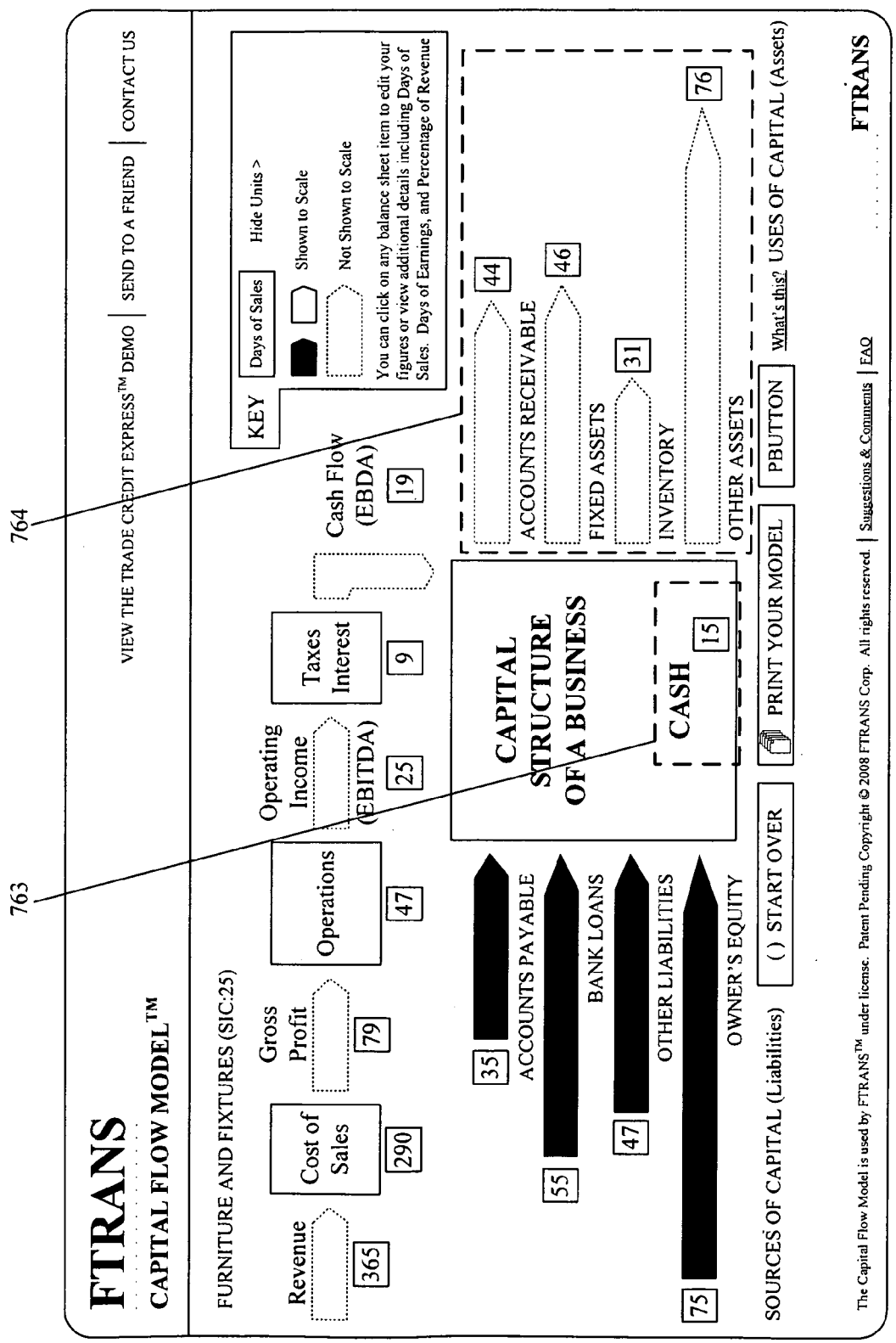

In one embodiment, a process for transforming and displaying accounting and finance information can facilitate the training of persons and shorten the associated period for learning accounting and finance. As shown in FIG. 7E, a flow chart 751 at the upper portion of the webpage illustrates transformed accounting and financial information, such as a summary income statement (statement of profit and loss), which is relatively easier to comprehend than the conventional financial statement illustrated in FIG. 1A. In a similar fashion, as shown in FIG. 7G, it is relatively easier to comprehend the transformed accounting and financial information that represents certain inflows 761 of capital and cash flow 762 from operations, which are sources of capital in an organization and what is known "liabilities and equity" on a conventional balance sheet. Further, as shown in FIG. 7H, the cash 763 and outflows 764 of capital, which are the "assets" on the balance sheet, can be graphically illustrated on the webpage with respect to the organization. It can be observed that the inflows 761 and 762, as shown in FIG. 7G, are "credits" in double-entry accounting and the outflows 764 are "debits." In this manner, using the transformed accounting and financial information in accordance with various embodiments can facilitate relatively easier understanding and quicker learning for students learning concepts of accounting and financial reporting.

Certain embodiments of systems and processes in accordance with the invention can provide a more comprehendible presentation of accounting and financial information. For example, the graphical presentation of an income statement and balance sheet in FIGS. 6, 7B, and 7C can be relatively easily grasped and the relationship of "sources of capital" and "uses of capital" can be comprehended more easily than by examining a conventional balance sheet. The identification of "sources of capital" and "uses of capital" and their impact on "cash" through embodiments of the invention can be made by certain users without training in accounting or finance, whereas the identification of certain conventional financial measures can require considerable training when examining a conventional balance sheet.

The example process elements of FIGS. 2A, 2B, 3, 4A, 4B, and 5 are shown by way of example, and other process and flow embodiments can have fewer or greater numbers of elements, and such elements can be arranged in alternative configurations in accordance with other embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, a special purpose processor device such as an accounting and financial information developer transformation machine, a special purpose computer such as a switch, or other programmable data processing apparatus to produce a machine, such that the instructions which execute on the computer or other programmable data processing apparatus create means for implementing the functions specified in the flowchart block or blocks. In certain instances, these computer program instructions, when executed by a computer or system, such as shown in FIG. 8, may form a special purpose computer for identifying and measuring trends in consumer content demand within vertically associated websites and related content.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational elements or steps to be performed on the computer or other programmable apparatus to produce a computer implemented process such that the instructions that execute on the computer or other programmable apparatus provide elements for implementing the functions specified in the flowchart block or blocks.

Accordingly, blocks of the block diagrams and flowchart illustrations support combinations of means for performing the specified functions, combinations of elements for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

While the above description contains many specifics, these should not be construed as limitations on the scope, but rather as an exemplification of several embodiments thereof. May other variations are possible. For example, the presentation of income statements and balance sheets as static and dynamic graphics allows the student of accounting or finance to quickly grasp the relationship between "sources of capital," which are liabilities and equity, and "uses of capital," which are assets, without having to first learn "debits and credits."

Moreover, the embodiments that utilize static, dynamic, graphics, sound, or tactile forms will further enhance the ability of persons with disabilities to comprehend financial information in situations where such information would be inaccessible.

Further, the embodiments that utilize alternative units will enhance the ability of persons not trained in accounting or finance to grasp the implications and impacts of operational or other changes in their organization.

The overall scope of several embodiments of the present invention have the potential to increase the literacy of the person with skill in the subject matters of accounting and finance as well as shorten the time required for persons being trained in those fields.

Accordingly, the scope should be determined not by the embodiments illustrated, but by the appended claims and their legal equivalents.

The invention claimed is:

1. A process for transforming and displaying financial information associated with a report, the process comprising:
   examining, by a processor, a plurality of elements to determine a respective information state associated with each of the plurality of elements;
   for each of the plurality of elements, selecting, by a processor, at least one scaled form based at least in part on a respective size and state associated with the respective element;
   selecting, by a processor, one or more sub-elements associated with the respective elements, each of the selected sub-elements being associated with a current unit of measure of the respective elements;
   selecting, by a processor, an alternative unit of measure for each of the one or more sub-elements;
   calculating at least one scaled form for each sub-element comprising a calculated value in the alternative unit of measure; and
   outputting the selected scaled forms for the elements and sub-elements in a presentation, wherein the respective size and state associated with at least one element is output, and wherein the alternative unit of measure associated with at least one sub-element is also output.

2. The process of claim 1, wherein the at least one form comprises at least one of the following: a static form, a static graphical figure, a moving form, a moving graphical figure, a tactile form, a sound form, and any combination thereof.

3. The process of claim 1, wherein the presentation comprises at least one tactile form generated by a machine or instrument operable to provide at least one tactile feeling.

4. The process of claim 1, wherein the presentation comprises at least one sound form generated by a machine or instrument operable to create sound waves capable of being sensed by a human.

5. The process of claim 1, wherein the presentation comprises at least one sound form generated by a machine or instrument operable to create an optical display capable of being viewed by a human.

6. The process of claim 1, wherein the presentation can be output by at least one of the following: an electrical display device, a computer generated display, a tactile output device, a speaker, a sound generating device, and any combination thereof.

7. The process of claim 1, wherein the elements and sub-elements comprise information from at least one of the following: a balance sheet, a statement of profit and loss, a statement of financial position, and a statement of cash flows.

8. A process for transforming and displaying financial elements associated with a report, the process comprising:
   examining, by a processor, each of a plurality of elements to determine current units of measure associated with each of the plurality of elements;
   determining, by a processor, a scaled form and an alternative unit of measure for each of the plurality of elements, wherein the scaled form is based at least in part on a respective size and state associated with each of the elements;
   selecting, by a processor, one or more sub-elements for output with the respective alternative unit of measures, each of the selected sub-elements being associated with the current units of measure of the respective elements;
   selecting at least one alternative unit of measures for each of the one or more sub-elements;
   calculating a value of the one or more sub-elements; and
   outputting, in a presentation, the scaled form for each of the elements, the current units of measure, and the calculated value in the alternative unit of measure for each of the selected sub-elements.

9. The process of claim 8, wherein the scaled form comprises at least one of the following: a static form, a static graphical figure, a moving form, a moving graphical figure, a tactile form, a sound form, and any combination thereof.

10. The process of claim 8, wherein the presentation comprises at least one tactile form generated by a machine or instrument operable to provide at least one tactile feeling.

11. The process of claim 8, wherein the presentation comprises at least one sound form generated by a machine or instrument operable to create sound waves capable of being sensed by a human.

12. The process of claim 8, wherein the presentation comprises at least one sound form generated by a machine or instrument operable to create an optical display capable of being viewed by a human.

13. The process of claim 8, wherein the presentation can be output by at least one of the following: an electrical display device, a computer generated display, a tactile output device, a speaker, a sound generating device, and any combination thereof.

14. The process of claim 8, wherein the elements and sub-elements comprise information from at least one of the following: a balance sheet, a statement of profit and loss, a statement of financial position, and a statement of cash flows.

15. The process of claim 8, wherein the alternative unit of measure comprises at least one of the following: days of sales, days of cash flow, hours of sales, weeks of sales, months of sales, and years of sales.

16. A system for transforming and displaying accounting and financial information, the system comprising:
   a processor operable to execute computer-executable instructions;

a data storage device comprising a developer transformation module comprising computer-executable instructions operable to:
- determine one or more elements with respective current units of measure in a financial report;
- transform each of the one or more elements into respective scaled forms for output to a presentation, wherein the scaled forms are each based at least in part on a respective size and state associated with each of the one or more elements;
- determine one or more sub-elements associated with the one or more elements, each of the sub-elements associated with the current units of measure;
- determine an alternative unit of measure for each of the one or more sub-elements; and
- transform each of the one or more sub-elements into respective forms for output to the presentation, wherein the respective forms comprise a value in the alternative units of measure for each of the sub-elements, and wherein alternative unit of measure associated with at least one sub-element is also output.

17. The system of claim 16, wherein the forms comprise at least one of the following: a static form, a dynamic form, graphics, a tactile form, a sound, and any combination thereof.

18. The system of claim 16, wherein the one or more elements comprise information from at least one of the following: a balance sheet, a statement of profit and loss, a statement of financial position, and a statement of cash flows.

19. The system of claim 16, wherein the developer transformation module further comprises computer-executable instructions further operable to output the presentation.

20. The system of claim 16, wherein the developer transformation module further comprises computer-executable instructions further operable to determine at least one alternative unit of measure for at least one of the elements, and can output the at least one alternative unit of measure in the presentation.

* * * * *